United States Patent
Kennewick, Jr. et al.

(10) Patent No.: US 10,614,799 B2
(45) Date of Patent: Apr. 7, 2020

(54) SYSTEM AND METHOD OF PROVIDING INTENT PREDICTIONS FOR AN UTTERANCE PRIOR TO A SYSTEM DETECTION OF AN END OF THE UTTERANCE

(71) Applicant: VoiceBox Technologies Corporation, Bellevue, WA (US)

(72) Inventors: Michael R. Kennewick, Jr., Bellevue, WA (US); Daniel B. Carter, Redmond, WA (US)

(73) Assignee: Voicebox Technologies Corporation, Bellevue, WA (US)

(*) Notice: Subject to any disclaimer, the term of this patent is extended or adjusted under 35 U.S.C. 154(b) by 0 days.

(21) Appl. No.: 14/951,384

(22) Filed: Nov. 24, 2015

(65) Prior Publication Data

US 2016/0148610 A1 May 26, 2016

Related U.S. Application Data

(60) Provisional application No. 62/085,015, filed on Nov. 26, 2014.

(51) Int. Cl.
*G10L 15/18* (2013.01)
*G10L 15/22* (2006.01)

(52) U.S. Cl.
CPC ........ *G10L 15/18* (2013.01); *G10L 2015/228* (2013.01)

(58) Field of Classification Search
CPC ................................ G10L 15/18; G06F 17/276

(Continued)

(56) References Cited

U.S. PATENT DOCUMENTS 4,430,669 A 2/1984 Cheung
4,821,027 A 4/1989 Mallory (Continued)

FOREIGN PATENT DOCUMENTS

CN 1433554 A 7/2003
CN 1860496 A 11/2006

(Continued)

OTHER PUBLICATIONS

"Statement in Accordance with the Notice from the European Patent Office" dated Oct. 1, 2007 Concerning Business Methods (OJ EPO Nov. 2007, 592-593), XP002456252.

(Continued)

*Primary Examiner* — Jakieda R Jackson
(74) *Attorney, Agent, or Firm* — Occhiuti & Rohlicek LLP

(57) ABSTRACT

In certain implementations, intent prediction is provided for a natural language utterance based on a portion of the natural language utterance prior to a system detection of an end of the natural language utterance. In some implementations, a first portion of a natural language utterance of a user may be received. Speech recognition may be performed on the first portion of the natural language utterance to recognize one or more words of the first portion of the natural language utterance. Context information for the natural language utterance may be obtained. Prior to a detection of an end of the natural language utterance, a first intent may be predicted based on the one or more words of the first portion and the context information. One or more user requests may be determined based on the first predicted intent.

31 Claims, 7 Drawing Sheets

(58) Field of Classification Search
USPC .......................................................... 704/9
See application file for complete search history.

(56) References Cited

U.S. PATENT DOCUMENTS

| | | |
|---|---|---|
| 4,829,423 A | 5/1989 | Tennant |
| 4,887,212 A | 12/1989 | Zamora |
| 4,910,784 A | 3/1990 | Doddington |
| 5,027,406 A | 6/1991 | Roberts |
| 5,155,743 A | 10/1992 | Jacobs |
| 5,164,904 A | 11/1992 | Sumner |
| 5,208,748 A | 5/1993 | Flores |
| 5,265,065 A | 11/1993 | Turtle |
| 5,274,560 A | 12/1993 | LaRue |
| 5,331,554 A | 7/1994 | Graham |
| 5,357,596 A | 10/1994 | Takebayashi |
| 5,369,575 A | 11/1994 | Lamberti |
| 5,377,350 A | 12/1994 | Skinner |
| 5,386,556 A | 1/1995 | Hedin |
| 5,424,947 A | 6/1995 | Nagao |
| 5,471,318 A | 11/1995 | Ahuja |
| 5,475,733 A | 12/1995 | Eisdorfer |
| 5,479,563 A | 12/1995 | Yamaguchi |
| 5,488,652 A | 1/1996 | Bielby |
| 5,499,289 A | 3/1996 | Bruno |
| 5,500,920 A | 3/1996 | Kupiec |
| 5,517,560 A | 5/1996 | Greenspan |
| 5,533,108 A | 7/1996 | Harris |
| 5,537,436 A | 7/1996 | Bottoms |
| 5,539,744 A | 7/1996 | Chu |
| 5,557,667 A | 9/1996 | Bruno |
| 5,559,864 A | 9/1996 | Kennedy, Jr. |
| 5,563,937 A | 10/1996 | Bruno |
| 5,577,165 A | 11/1996 | Takebayashi |
| 5,590,039 A | 12/1996 | Ikeda |
| 5,608,635 A | 3/1997 | Tamai |
| 5,617,407 A | 4/1997 | Bareis |
| 5,633,922 A | 5/1997 | August |
| 5,634,086 A | 5/1997 | Rtischev |
| 5,652,570 A | 7/1997 | Lepkofker |
| 5,675,629 A | 10/1997 | Raffel |
| 5,696,965 A | 12/1997 | Dedrick |
| 5,708,422 A | 1/1998 | Blonder |
| 5,721,938 A | 2/1998 | Stuckey |
| 5,722,084 A | 2/1998 | Chakrin |
| 5,740,256 A | 4/1998 | CastelloDaCosta |
| 5,742,763 A | 4/1998 | Jones |
| 5,748,841 A | 5/1998 | Morin |
| 5,748,974 A | 5/1998 | Johnson |
| 5,752,052 A | 5/1998 | Richardson |
| 5,754,784 A | 5/1998 | Garland |
| 5,761,631 A | 6/1998 | Nasukawa |
| 5,774,841 A | 6/1998 | Salazar |
| 5,774,859 A | 6/1998 | Houser |
| 5,794,050 A | 8/1998 | Dahlgren |
| 5,794,196 A | 8/1998 | Yegnanarayanan |
| 5,797,112 A | 8/1998 | Komatsu |
| 5,799,276 A | 8/1998 | Komissarchik |
| 5,802,510 A | 9/1998 | Jones |
| 5,829,000 A | 10/1998 | Huang |
| 5,832,221 A | 11/1998 | Jones |
| 5,839,107 A | 11/1998 | Gupta |
| 5,848,396 A | 12/1998 | Gerace |
| 5,855,000 A | 12/1998 | Waibel |
| 5,867,817 A | 2/1999 | Catallo |
| 5,878,385 A | 3/1999 | Bralich |
| 5,878,386 A | 3/1999 | Coughlin |
| 5,892,813 A | 4/1999 | Morin |
| 5,892,900 A | 4/1999 | Ginter |
| 5,895,464 A | 4/1999 | Bhandari |
| 5,895,466 A | 4/1999 | Goldberg |
| 5,897,613 A | 4/1999 | Chan |
| 5,902,347 A | 5/1999 | Backman |
| 5,911,120 A | 6/1999 | Jarett |
| 5,918,222 A | 6/1999 | Fukui |
| 5,926,784 A | 7/1999 | Richardson |
| 5,933,822 A | 8/1999 | Braden-Harder |
| 5,950,167 A | 9/1999 | Yaker |
| 5,953,393 A | 9/1999 | Culbreth |
| 5,960,384 A | 9/1999 | Brash |
| 5,960,397 A | 9/1999 | Rahim |
| 5,960,399 A | 9/1999 | Barclay |
| 5,960,447 A | 9/1999 | Holt |
| 5,963,894 A | 10/1999 | Richardson |
| 5,963,940 A | 10/1999 | Liddy |
| 5,983,190 A | 11/1999 | Trower, II |
| 5,987,404 A | 11/1999 | DellaPietra |
| 5,991,721 A | 11/1999 | Asano |
| 5,995,119 A | 11/1999 | Cosatto |
| 5,995,928 A | 11/1999 | Nguyen |
| 5,995,943 A | 11/1999 | Bull |
| 6,009,382 A | 12/1999 | Martino |
| 6,014,559 A | 1/2000 | Amin |
| 6,018,708 A | 1/2000 | Dahan |
| 6,021,384 A | 2/2000 | Gorin |
| 6,028,514 A | 2/2000 | Lemelson |
| 6,035,267 A | 3/2000 | Watanabe |
| 6,044,347 A | 3/2000 | Abella |
| 6,049,602 A | 4/2000 | Foladare |
| 6,049,607 A | 4/2000 | Marash |
| 6,058,187 A | 5/2000 | Chen |
| 6,067,513 A | 5/2000 | Ishimitsu |
| 6,073,098 A | 6/2000 | Buchsbaum |
| 6,076,059 A | 6/2000 | Glickman |
| 6,078,886 A | 6/2000 | Dragosh |
| 6,081,774 A | 6/2000 | deHita |
| 6,085,186 A | 7/2000 | Christianson |
| 6,101,241 A | 8/2000 | Boyce |
| 6,108,631 A | 8/2000 | Ruhl |
| 6,119,087 A | 9/2000 | Kuhn |
| 6,119,101 A | 9/2000 | Peckover |
| 6,122,613 A | 9/2000 | Baker |
| 6,134,235 A | 10/2000 | Goldman |
| 6,144,667 A | 11/2000 | Doshi |
| 6,144,938 A | 11/2000 | Surace |
| 6,154,526 A | 11/2000 | Dahlke |
| 6,160,883 A | 12/2000 | Jackson |
| 6,167,377 A | 12/2000 | Gillick |
| 6,173,266 B1 | 1/2001 | Marx |
| 6,173,279 B1 | 1/2001 | Levin |
| 6,175,858 B1 | 1/2001 | Bulfer |
| 6,185,535 B1 | 2/2001 | Hedin |
| 6,188,982 B1 | 2/2001 | Chiang |
| 6,192,110 B1 | 2/2001 | Abella |
| 6,192,338 B1 | 2/2001 | Haszto |
| 6,195,634 B1 | 2/2001 | Dudemaine |
| 6,195,651 B1 | 2/2001 | Handel |
| 6,199,043 B1 | 3/2001 | Happ |
| 6,208,964 B1 | 3/2001 | Sabourin |
| 6,208,972 B1 | 3/2001 | Grant |
| 6,219,346 B1 | 4/2001 | Maxemchuk |
| 6,219,643 B1 | 4/2001 | Cohen |
| 6,219,645 B1 | 4/2001 | Byers |
| 6,226,612 B1 | 5/2001 | Srenger |
| 6,233,556 B1 | 5/2001 | Teunen |
| 6,233,559 B1 | 5/2001 | Balakrishnan |
| 6,233,561 B1 | 5/2001 | Junqua |
| 6,236,968 B1 | 5/2001 | Kanevsky |
| 6,243,679 B1 | 6/2001 | Mohri |
| 6,246,981 B1 | 6/2001 | Papineni |
| 6,246,990 B1 | 6/2001 | Happ |
| 6,266,636 B1 | 7/2001 | Kosaka |
| 6,269,336 B1 | 7/2001 | Ladd |
| 6,272,455 B1 | 8/2001 | Hoshen |
| 6,275,231 B1 | 8/2001 | Obradovich |
| 6,278,377 B1 | 8/2001 | DeLine |
| 6,278,968 B1 | 8/2001 | Franz |
| 6,286,002 B1 | 9/2001 | Axaopoulos |
| 6,288,319 B1 | 9/2001 | Catona |
| 6,292,767 B1 | 9/2001 | Jackson |
| 6,301,560 B1 | 10/2001 | Masters |
| 6,308,151 B1 | 10/2001 | Smith |
| 6,311,159 B1 | 10/2001 | VanTichelen |
| 6,314,402 B1 | 11/2001 | Monaco |

(56) References Cited

U.S. PATENT DOCUMENTS

| | | |
|---|---|---|
| 6,321,196 B1 | 11/2001 | Franceschi |
| 6,356,869 B1 | 3/2002 | Chapados |
| 6,362,748 B1 | 3/2002 | Huang |
| 6,366,882 B1 | 4/2002 | Bijl |
| 6,366,886 B1 | 4/2002 | Dragosh |
| 6,374,214 B1 | 4/2002 | Friedland |
| 6,377,913 B1 | 4/2002 | Coffman |
| 6,381,535 B1 | 4/2002 | Durocher |
| 6,385,596 B1 | 5/2002 | Wiser |
| 6,385,646 B1 | 5/2002 | Brown |
| 6,389,398 B1 | 5/2002 | Lustgarten |
| 6,393,403 B1 | 5/2002 | Majaniemi |
| 6,393,428 B1 | 5/2002 | Miller |
| 6,397,181 B1 | 5/2002 | Li |
| 6,404,878 B1 | 6/2002 | Jackson |
| 6,405,170 B1 | 6/2002 | Phillips |
| 6,408,272 B1 | 6/2002 | White |
| 6,411,810 B1 | 6/2002 | Maxemchuk |
| 6,411,893 B2 | 6/2002 | Ruhl |
| 6,415,257 B1 | 7/2002 | Junqua |
| 6,418,210 B1 | 7/2002 | Sayko |
| 6,420,975 B1 | 7/2002 | Deline |
| 6,429,813 B2 | 8/2002 | Feigen |
| 6,430,285 B1 | 8/2002 | Bauer |
| 6,430,531 B1 | 8/2002 | Polish |
| 6,434,523 B1 | 8/2002 | Monaco |
| 6,434,524 B1 | 8/2002 | Weber |
| 6,434,529 B1 | 8/2002 | Walker |
| 6,442,522 B1 | 8/2002 | Carberry |
| 6,446,114 B1 | 9/2002 | Bulfer |
| 6,453,153 B1 | 9/2002 | Bowker |
| 6,453,292 B2 | 9/2002 | Ramaswamy |
| 6,456,711 B1 | 9/2002 | Cheung |
| 6,456,974 B1 | 9/2002 | Baker |
| 6,466,654 B1 | 10/2002 | Cooper |
| 6,466,899 B1 | 10/2002 | Yano |
| 6,470,315 B1 | 10/2002 | Netsch |
| 6,487,494 B2 | 11/2002 | Odinak |
| 6,487,495 B1 | 11/2002 | Gale |
| 6,498,797 B1 | 12/2002 | Anerousis |
| 6,499,013 B1 | 12/2002 | Weber |
| 6,501,833 B2 | 12/2002 | Phillips |
| 6,501,834 B1 | 12/2002 | Milewski |
| 6,505,155 B1 | 1/2003 | Vanbuskirk |
| 6,510,417 B1 | 1/2003 | Woods |
| 6,513,006 B2 | 1/2003 | Howard |
| 6,522,746 B1 | 2/2003 | Marchok |
| 6,523,061 B1 | 2/2003 | Halverson |
| 6,532,444 B1 | 3/2003 | Weber |
| 6,539,348 B1 | 3/2003 | Bond |
| 6,549,629 B2 | 4/2003 | Finn |
| 6,553,372 B1 | 4/2003 | Brassell |
| 6,556,970 B1 | 4/2003 | Sasaki |
| 6,556,973 B1 | 4/2003 | Lewin |
| 6,560,576 B1 | 5/2003 | Cohen |
| 6,560,590 B1 | 5/2003 | Shwe |
| 6,567,778 B1 | 5/2003 | ChaoChang |
| 6,567,797 B1 | 5/2003 | Schuetze |
| 6,567,805 B1 | 5/2003 | Johnson |
| 6,570,555 B1 | 5/2003 | Prevost |
| 6,570,964 B1 | 5/2003 | Murveit |
| 6,571,279 B1 | 5/2003 | Herz |
| 6,574,597 B1 | 6/2003 | Mohri |
| 6,574,624 B1 | 6/2003 | Johnson |
| 6,578,022 B1 | 6/2003 | Foulger |
| 6,581,103 B1 | 6/2003 | Dengler |
| 6,584,439 B1 | 6/2003 | Geilhufe |
| 6,587,858 B1 | 7/2003 | Strazza |
| 6,591,185 B1 | 7/2003 | Polidi |
| 6,591,239 B1 | 7/2003 | McCall |
| 6,594,257 B1 | 7/2003 | Doshi |
| 6,594,367 B1 | 7/2003 | Marash |
| 6,598,018 B1 | 7/2003 | Junqua |
| 6,601,026 B2 | 7/2003 | Appelt |
| 6,604,075 B1 | 8/2003 | Brown |
| 6,604,077 B2 | 8/2003 | Dragosh |
| 6,606,598 B1 | 8/2003 | Holthouse |
| 6,611,692 B2 | 8/2003 | Raffel |
| 6,614,773 B1 | 9/2003 | Maxemchuk |
| 6,615,172 B1 | 9/2003 | Bennett |
| 6,622,119 B1 | 9/2003 | Ramaswamy |
| 6,629,066 B1 | 9/2003 | Jackson |
| 6,631,346 B1 | 10/2003 | Karaorman |
| 6,631,351 B1 | 10/2003 | Ramachandran |
| 6,633,846 B1 | 10/2003 | Bennett |
| 6,636,790 B1 | 10/2003 | Lightner |
| 6,643,620 B1 | 11/2003 | Contolini |
| 6,647,363 B2 | 11/2003 | Claassen |
| 6,650,747 B1 | 11/2003 | Bala |
| 6,658,388 B1 | 12/2003 | Kleindienst |
| 6,678,680 B1 | 1/2004 | Woo |
| 6,681,206 B1 | 1/2004 | Gorin |
| 6,691,151 B1 | 2/2004 | Cheyer |
| 6,701,294 B1 | 3/2004 | Ball |
| 6,704,396 B2 | 3/2004 | Parolkar |
| 6,704,576 B1 | 3/2004 | Brachman |
| 6,704,708 B1 | 3/2004 | Pickering |
| 6,707,421 B1 | 3/2004 | Drury |
| 6,708,150 B1 | 3/2004 | Hirayama |
| 6,721,001 B1 | 4/2004 | Berstis |
| 6,721,633 B2 | 4/2004 | Funk |
| 6,721,706 B1 | 4/2004 | Strubbe |
| 6,726,636 B2 | 4/2004 | DerGhazarian |
| 6,735,592 B1 | 5/2004 | Neumann |
| 6,739,556 B1 | 5/2004 | Langston |
| 6,741,931 B1 | 5/2004 | Kohut |
| 6,742,021 B1 | 5/2004 | Halverson |
| 6,745,161 B1 | 6/2004 | Arnold |
| 6,751,591 B1 | 6/2004 | Gorin |
| 6,751,612 B1 | 6/2004 | Schuetze |
| 6,754,485 B1 | 6/2004 | Obradovich |
| 6,754,627 B2 | 6/2004 | Woodward |
| 6,757,544 B2 | 6/2004 | Rangarajan |
| 6,757,718 B1 | 6/2004 | Halverson |
| 6,795,808 B1 | 9/2004 | Strubbe |
| 6,801,604 B2 | 10/2004 | Maes |
| 6,801,893 B1 | 10/2004 | Backfried |
| 6,810,375 B1 | 10/2004 | Ejerhed |
| 6,813,341 B1 | 11/2004 | Mahoney |
| 6,816,830 B1 | 11/2004 | Kempe |
| 6,829,603 B1 | 12/2004 | Chai |
| 6,832,230 B1 | 12/2004 | Zilliacus |
| 6,833,848 B1 | 12/2004 | Wolff |
| 6,850,603 B1 | 2/2005 | Eberle |
| 6,856,990 B2 | 2/2005 | Barile |
| 6,865,481 B2 | 3/2005 | Kawazoe |
| 6,868,380 B2 | 3/2005 | Kroeker |
| 6,868,385 B1 | 3/2005 | Gerson |
| 6,871,179 B1 | 3/2005 | Kist |
| 6,873,837 B1 | 3/2005 | Yoshioka |
| 6,877,001 B2 | 4/2005 | Wolf |
| 6,877,134 B1 | 4/2005 | Fuller |
| 6,882,970 B1 | 4/2005 | Garner |
| 6,901,366 B1 | 5/2005 | Kuhn |
| 6,910,003 B1 | 6/2005 | Arnold |
| 6,912,498 B2 | 6/2005 | Stevens |
| 6,915,126 B2 | 7/2005 | Mazzara, Jr. |
| 6,928,614 B1 | 8/2005 | Everhart |
| 6,934,756 B2 | 8/2005 | Maes |
| 6,937,977 B2 | 8/2005 | Gerson |
| 6,937,982 B2 | 8/2005 | Kitaoka |
| 6,941,266 B1 | 9/2005 | Gorin |
| 6,944,594 B2 | 9/2005 | Busayapongchai |
| 6,950,821 B2 | 9/2005 | Faybishenko |
| 6,954,755 B2 | 10/2005 | Reisman |
| 6,959,276 B2 | 10/2005 | Droppo |
| 6,961,700 B2 | 11/2005 | Mitchell |
| 6,963,759 B1 | 11/2005 | Gerson |
| 6,964,023 B2 | 11/2005 | Maes |
| 6,968,311 B2 | 11/2005 | Knockeart |
| 6,973,387 B2 | 12/2005 | Masclet |
| 6,975,993 B1 | 12/2005 | Keiller |
| 6,980,092 B2 | 12/2005 | Turnbull |
| 6,983,055 B2 | 1/2006 | Luo |

(56) References Cited

U.S. PATENT DOCUMENTS

| | | |
|---|---|---|
| 6,990,513 B2 | 1/2006 | Belfiore |
| 6,996,531 B2 | 2/2006 | Korall |
| 7,003,463 B1 | 2/2006 | Maes |
| 7,016,849 B2 | 3/2006 | Arnold |
| 7,020,609 B2 | 3/2006 | Thrift |
| 7,024,364 B2 | 4/2006 | Guerra |
| 7,027,586 B2 | 4/2006 | Bushey |
| 7,027,974 B1 | 4/2006 | Busch |
| 7,027,975 B1 | 4/2006 | Pazandak |
| 7,035,415 B2 | 4/2006 | Belt |
| 7,036,128 B1 | 4/2006 | Julia |
| 7,043,425 B2 | 5/2006 | Pao |
| 7,054,817 B2 | 5/2006 | Shao |
| 7,058,890 B2 | 6/2006 | George |
| 7,062,488 B1 | 6/2006 | Reisman |
| 7,069,220 B2 | 6/2006 | Coffman |
| 7,072,834 B2 | 7/2006 | Zhou |
| 7,076,362 B2 | 7/2006 | Ohtsuji |
| 7,082,469 B2 | 7/2006 | Gold |
| 7,085,708 B2 | 8/2006 | Manson |
| 7,092,928 B1 | 8/2006 | Elad |
| 7,107,210 B2 | 9/2006 | Deng |
| 7,107,218 B1 | 9/2006 | Preston |
| 7,110,951 B1 | 9/2006 | Lemelson |
| 7,127,395 B1 | 10/2006 | Gorin |
| 7,127,400 B2 | 10/2006 | Koch |
| 7,130,390 B2 | 10/2006 | Abburi |
| 7,136,875 B2 | 11/2006 | Anderson |
| 7,137,126 B1 | 11/2006 | Coffman |
| 7,143,037 B1 | 11/2006 | Chestnut |
| 7,143,039 B1 | 11/2006 | Stifelman |
| 7,146,319 B2 | 12/2006 | Hunt |
| 7,149,696 B2 | 12/2006 | Shimizu |
| 7,165,028 B2 | 1/2007 | Gong |
| 7,170,993 B2 | 1/2007 | Anderson |
| 7,171,291 B2 | 1/2007 | Obradovich |
| 7,174,300 B2 | 2/2007 | Bush |
| 7,177,798 B2 | 2/2007 | Hsu |
| 7,184,957 B2 | 2/2007 | Brookes |
| 7,190,770 B2 | 3/2007 | Ando |
| 7,197,069 B2 | 3/2007 | Agazzi |
| 7,197,460 B1 | 3/2007 | Gupta |
| 7,203,644 B2 | 4/2007 | Anderson |
| 7,206,418 B2 | 4/2007 | Yang |
| 7,207,011 B2 | 4/2007 | Mulvey |
| 7,215,941 B2 | 5/2007 | Beckmann |
| 7,228,276 B2 | 6/2007 | Omote |
| 7,231,343 B1 | 6/2007 | Treadgold |
| 7,236,923 B1 | 6/2007 | Gupta |
| 7,254,482 B2 | 8/2007 | Kawasaki |
| 7,272,212 B2 | 9/2007 | Eberle |
| 7,277,854 B2 | 10/2007 | Bennett |
| 7,283,829 B2 | 10/2007 | Christenson |
| 7,283,951 B2 | 10/2007 | Marchisio |
| 7,289,606 B2 | 10/2007 | Sibal |
| 7,299,186 B2 | 11/2007 | Kuzunuki |
| 7,301,093 B2 | 11/2007 | Sater |
| 7,305,381 B1 | 12/2007 | Poppink |
| 7,321,850 B2 | 1/2008 | Wakita |
| 7,328,155 B2 | 2/2008 | Endo |
| 7,337,116 B2 | 2/2008 | Charlesworth |
| 7,340,040 B1 | 3/2008 | Saylor |
| 7,366,285 B2 | 4/2008 | Parolkar |
| 7,366,669 B2 | 4/2008 | Nishitani |
| 7,376,645 B2 | 5/2008 | Bernard |
| 7,380,250 B2 | 5/2008 | Schechter |
| 7,386,443 B1 | 6/2008 | Parthasarathy |
| 7,398,209 B2 | 7/2008 | Kennewick |
| 7,406,421 B2 | 7/2008 | Odinak |
| 7,415,100 B2 | 8/2008 | Cooper |
| 7,415,414 B2 | 8/2008 | Azara |
| 7,421,393 B1 | 9/2008 | DiFabbrizio |
| 7,424,431 B2 | 9/2008 | Greene |
| 7,447,635 B1 | 11/2008 | Konopka |
| 7,451,088 B1 | 11/2008 | Ehlen |
| 7,454,368 B2 | 11/2008 | Stillman |
| 7,454,608 B2 | 11/2008 | Gopalakrishnan |
| 7,461,059 B2 | 12/2008 | Richardson |
| 7,472,020 B2 | 12/2008 | Brulle-Drews |
| 7,472,060 B1 | 12/2008 | Gorin |
| 7,472,075 B2 | 12/2008 | Odinak |
| 7,477,909 B2 | 1/2009 | Roth |
| 7,478,036 B2 | 1/2009 | Shen |
| 7,487,088 B1 | 2/2009 | Gorin |
| 7,487,110 B2 | 2/2009 | Bennett |
| 7,493,259 B2 | 2/2009 | Jones |
| 7,493,559 B1 | 2/2009 | Wolff |
| 7,502,672 B1 | 3/2009 | Kolls |
| 7,502,738 B2 | 3/2009 | Kennewick |
| 7,512,906 B1 | 3/2009 | Baier |
| 7,516,076 B2 | 4/2009 | Walker |
| 7,529,675 B2 | 5/2009 | Maes |
| 7,536,297 B2 | 5/2009 | Byrd |
| 7,536,374 B2 | 5/2009 | Au |
| 7,542,894 B2 | 6/2009 | Murata |
| 7,546,382 B2 | 6/2009 | Healey |
| 7,548,491 B2 | 6/2009 | Macfarlane |
| 7,552,054 B1 | 6/2009 | Stifelman |
| 7,558,730 B2 | 7/2009 | Davis |
| 7,574,362 B2 | 8/2009 | Walker |
| 7,577,244 B2 | 8/2009 | Taschereau |
| 7,606,708 B2 | 10/2009 | Hwang |
| 7,606,712 B1 | 10/2009 | Smith |
| 7,620,549 B2 | 11/2009 | DiCristo |
| 7,634,409 B2 | 12/2009 | Kennewick |
| 7,640,006 B2 | 12/2009 | Portman |
| 7,640,160 B2 | 12/2009 | DiCristo |
| 7,640,272 B2 | 12/2009 | Mahajan |
| 7,672,931 B2 | 3/2010 | Hurst-Hiller |
| 7,676,365 B2 | 3/2010 | Hwang |
| 7,676,369 B2 | 3/2010 | Fujimoto |
| 7,684,977 B2 | 3/2010 | Morikawa |
| 7,693,720 B2 | 4/2010 | Kennewick |
| 7,697,673 B2 | 4/2010 | Chiu |
| 7,706,616 B2 | 4/2010 | Kristensson |
| 7,729,916 B2 | 6/2010 | Coffman |
| 7,729,918 B2 | 6/2010 | Walker |
| 7,729,920 B2 | 6/2010 | Chaar |
| 7,734,287 B2 | 6/2010 | Ying |
| 7,748,021 B2 | 6/2010 | Obradovich |
| 7,788,084 B2 | 8/2010 | Brun |
| 7,792,257 B1 | 9/2010 | Vanier |
| 7,801,731 B2 | 9/2010 | Odinak |
| 7,809,570 B2 | 10/2010 | Kennewick |
| 7,818,176 B2 | 10/2010 | Freeman |
| 7,831,426 B2 | 11/2010 | Bennett |
| 7,831,433 B1 | 11/2010 | Belvin |
| 7,856,358 B2 | 12/2010 | Ho |
| 7,873,519 B2 | 1/2011 | Bennett |
| 7,873,523 B2 | 1/2011 | Potter |
| 7,873,654 B2 | 1/2011 | Bernard |
| 7,881,936 B2 | 2/2011 | Longe |
| 7,890,324 B2 | 2/2011 | Bangalore |
| 7,894,849 B2 | 2/2011 | Kass |
| 7,902,969 B2 | 3/2011 | Obradovich |
| 7,917,367 B2 | 3/2011 | DiCristo |
| 7,920,682 B2 | 4/2011 | Byrne |
| 7,949,529 B2 | 5/2011 | Weider |
| 7,949,537 B2 | 5/2011 | Walker |
| 7,953,732 B2 | 5/2011 | Frank |
| 7,974,875 B1 | 7/2011 | Quilici |
| 7,983,917 B2 | 7/2011 | Kennewick |
| 7,984,287 B2 | 7/2011 | Gopalakrishnan |
| 8,005,683 B2 | 8/2011 | Tessel |
| 8,015,006 B2 | 9/2011 | Kennewick |
| 8,027,965 B2 | 9/2011 | Takehara |
| 8,032,383 B1 | 10/2011 | Bhardwaj |
| 8,060,367 B2 | 11/2011 | Keaveney |
| 8,069,046 B2 | 11/2011 | Kennewick |
| 8,073,681 B2 | 12/2011 | Baldwin |
| 8,077,975 B2 | 12/2011 | Ma |
| 8,082,153 B2 | 12/2011 | Coffman |
| 8,086,463 B2 | 12/2011 | Ativanichayaphong |
| 8,103,510 B2 | 1/2012 | Sato |

(56) References Cited

U.S. PATENT DOCUMENTS

| | | |
|---|---|---|
| 8,112,275 B2 | 2/2012 | Kennewick |
| 8,140,327 B2 | 3/2012 | Kennewick |
| 8,140,335 B2 | 3/2012 | Kennewick |
| 8,145,489 B2 | 3/2012 | Freeman |
| 8,150,694 B2 | 4/2012 | Kennewick |
| 8,155,962 B2 | 4/2012 | Kennewick |
| 8,170,867 B2 | 5/2012 | Germain |
| 8,180,037 B1 | 5/2012 | Delker |
| 8,195,468 B2 | 6/2012 | Weider |
| 8,200,485 B1 | 6/2012 | Lee |
| 8,219,399 B2 | 7/2012 | Lutz |
| 8,219,599 B2 | 7/2012 | Tunstall-Pedoe |
| 8,224,652 B2 | 7/2012 | Wang |
| 8,255,224 B2 | 8/2012 | Singleton |
| 8,326,599 B2 | 12/2012 | Tomeh |
| 8,326,627 B2 | 12/2012 | Kennewick |
| 8,326,634 B2 | 12/2012 | DiCristo |
| 8,326,637 B2 | 12/2012 | Baldwin |
| 8,332,224 B2 | 12/2012 | DiCristo |
| 8,340,975 B1 | 12/2012 | Rosenberger |
| 8,346,563 B1 | 1/2013 | Hjelm |
| 8,370,147 B2 | 2/2013 | Kennewick |
| 8,447,607 B2 | 5/2013 | Weider |
| 8,447,651 B1 | 5/2013 | Scholl |
| 8,452,598 B2 | 5/2013 | Kennewick |
| 8,503,995 B2 | 8/2013 | Ramer |
| 8,509,403 B2 | 8/2013 | Chiu |
| 8,515,765 B2 | 8/2013 | Baldwin |
| 8,527,274 B2 | 9/2013 | Freeman |
| 8,577,671 B1 | 11/2013 | Barve |
| 8,589,161 B2 | 11/2013 | Kennewick |
| 8,612,205 B2 | 12/2013 | Hanneman |
| 8,612,206 B2 | 12/2013 | Chalabi |
| 8,620,659 B2 | 12/2013 | DiCristo |
| 8,719,005 B1 | 5/2014 | Lee |
| 8,719,009 B2 | 5/2014 | Baldwin |
| 8,719,026 B2 | 5/2014 | Kennewick |
| 8,731,929 B2 | 5/2014 | Kennewick |
| 8,738,380 B2 | 5/2014 | Baldwin |
| 8,849,652 B2 | 9/2014 | Weider |
| 8,849,670 B2 | 9/2014 | DiCristo |
| 8,849,696 B2 | 9/2014 | Pansari |
| 8,849,791 B1 | 9/2014 | Hertschuh |
| 8,886,536 B2 | 11/2014 | Freeman |
| 8,972,243 B1 | 3/2015 | Strom |
| 8,983,839 B2 | 3/2015 | Kennewick |
| 9,009,046 B1 | 4/2015 | Stewart |
| 9,015,049 B2 | 4/2015 | Baldwin |
| 9,037,455 B1 | 5/2015 | Faaborg |
| 9,070,366 B1 | 6/2015 | Mathias |
| 9,105,266 B2 | 8/2015 | Baldwin |
| 9,171,541 B2 | 10/2015 | Kennewick |
| 9,269,097 B2 | 2/2016 | Freeman |
| 9,305,548 B2 | 4/2016 | Kennewick |
| 9,308,445 B1 | 4/2016 | Merzenich |
| 9,406,078 B2 | 8/2016 | Freeman |
| 9,502,025 B2 | 11/2016 | Kennewick |
| 2001/0039492 A1 | 11/2001 | Nemoto |
| 2001/0041980 A1 | 11/2001 | Howard |
| 2001/0049601 A1 | 12/2001 | Kroeker |
| 2001/0054087 A1 | 12/2001 | Flom |
| 2002/0007267 A1 | 1/2002 | Batchilo |
| 2002/0010584 A1 | 1/2002 | Schultz |
| 2002/0015500 A1 | 2/2002 | Belt |
| 2002/0022927 A1 | 2/2002 | Lemelson |
| 2002/0022956 A1 | 2/2002 | Ukrainczyk |
| 2002/0029186 A1 | 3/2002 | Roth |
| 2002/0029261 A1 | 3/2002 | Shibata |
| 2002/0032752 A1 | 3/2002 | Gold |
| 2002/0035501 A1 | 3/2002 | Handel |
| 2002/0040297 A1 | 4/2002 | Tsiao |
| 2002/0049535 A1 | 4/2002 | Rigo |
| 2002/0049805 A1 | 4/2002 | Yamada |
| 2002/0059068 A1 | 5/2002 | Rose |
| 2002/0065568 A1 | 5/2002 | Silfvast |
| 2002/0067839 A1 | 6/2002 | Heinrich |
| 2002/0069059 A1 | 6/2002 | Smith |
| 2002/0069071 A1 | 6/2002 | Knockeart |
| 2002/0073176 A1 | 6/2002 | Ikeda |
| 2002/0082911 A1 | 6/2002 | Dunn |
| 2002/0087312 A1 | 7/2002 | Lee |
| 2002/0087326 A1 | 7/2002 | Lee |
| 2002/0087525 A1 | 7/2002 | Abbott |
| 2002/0107694 A1 | 8/2002 | Lerg |
| 2002/0120609 A1 | 8/2002 | Lang |
| 2002/0124050 A1 | 9/2002 | Middeljans |
| 2002/0133354 A1 | 9/2002 | Ross |
| 2002/0133402 A1 | 9/2002 | Faber |
| 2002/0135618 A1 | 9/2002 | Maes |
| 2002/0138248 A1 | 9/2002 | Corston-Oliver |
| 2002/0143532 A1 | 10/2002 | McLean |
| 2002/0143535 A1 | 10/2002 | Kist |
| 2002/0152260 A1 | 10/2002 | Chen |
| 2002/0161646 A1 | 10/2002 | Gailey |
| 2002/0161647 A1 | 10/2002 | Gailey |
| 2002/0173333 A1 | 11/2002 | Buchholz |
| 2002/0173961 A1 | 11/2002 | Guerra |
| 2002/0184373 A1 | 12/2002 | Maes |
| 2002/0188602 A1 | 12/2002 | Stubler |
| 2002/0198714 A1 | 12/2002 | Zhou |
| 2003/0014261 A1 | 1/2003 | Kageyama |
| 2003/0016835 A1 | 1/2003 | Elko |
| 2003/0046346 A1 | 3/2003 | Mumick |
| 2003/0064709 A1 | 4/2003 | Gailey |
| 2003/0065427 A1 | 4/2003 | Funk |
| 2003/0069734 A1 | 4/2003 | Everhart |
| 2003/0069880 A1 | 4/2003 | Harrison |
| 2003/0088421 A1 | 5/2003 | Maes |
| 2003/0093419 A1 | 5/2003 | Bangalore |
| 2003/0097249 A1 | 5/2003 | Walker |
| 2003/0110037 A1 | 6/2003 | Walker |
| 2003/0112267 A1 | 6/2003 | Belrose |
| 2003/0115062 A1 | 6/2003 | Walker |
| 2003/0120493 A1 | 6/2003 | Gupta |
| 2003/0135488 A1 | 7/2003 | Amir |
| 2003/0144846 A1 | 7/2003 | Denenberg |
| 2003/0158731 A1 | 8/2003 | Falcon |
| 2003/0161448 A1 | 8/2003 | Parolkar |
| 2003/0174155 A1 | 9/2003 | Weng |
| 2003/0182132 A1 | 9/2003 | Niemoeller |
| 2003/0187643 A1 | 10/2003 | VanThong |
| 2003/0204492 A1 | 10/2003 | Wolf |
| 2003/0206640 A1 | 11/2003 | Malvar |
| 2003/0212550 A1 | 11/2003 | Ubale |
| 2003/0212558 A1 | 11/2003 | Matula |
| 2003/0212562 A1 | 11/2003 | Patel |
| 2003/0225825 A1 | 12/2003 | Healey |
| 2003/0236664 A1 | 12/2003 | Sharma |
| 2004/0006475 A1 | 1/2004 | Ehlen |
| 2004/0010358 A1 | 1/2004 | Oesterling |
| 2004/0025115 A1 | 2/2004 | Sienel |
| 2004/0030741 A1 | 2/2004 | Wolton |
| 2004/0036601 A1 | 2/2004 | Obradovich |
| 2004/0044516 A1 | 3/2004 | Kennewick |
| 2004/0093567 A1 | 5/2004 | Schabes |
| 2004/0098245 A1 | 5/2004 | Walker |
| 2004/0102977 A1 | 5/2004 | Metzler |
| 2004/0117179 A1 | 6/2004 | Balasuriya |
| 2004/0117804 A1 | 6/2004 | Scahill |
| 2004/0122674 A1 | 6/2004 | Bangalore |
| 2004/0133793 A1 | 7/2004 | Ginter |
| 2004/0140989 A1 | 7/2004 | Papageorge |
| 2004/0148154 A1 | 7/2004 | Acero |
| 2004/0148170 A1 | 7/2004 | Acero |
| 2004/0158555 A1 | 8/2004 | Seedman |
| 2004/0166832 A1 | 8/2004 | Portman |
| 2004/0167771 A1 | 8/2004 | Duan |
| 2004/0172247 A1 | 9/2004 | Yoon |
| 2004/0172258 A1 | 9/2004 | Dominach |
| 2004/0189697 A1 | 9/2004 | Fukuoka |
| 2004/0193408 A1 | 9/2004 | Hunt |
| 2004/0193420 A1 | 9/2004 | Kennewick |
| 2004/0199375 A1 | 10/2004 | Ehsani |
| 2004/0199389 A1 | 10/2004 | Geiger |

(56) References Cited

U.S. PATENT DOCUMENTS

| | | |
|---|---|---|
| 2004/0205671 A1 | 10/2004 | Sukehiro |
| 2004/0243417 A9 | 12/2004 | Pitts |
| 2004/0247092 A1 | 12/2004 | Timmins |
| 2005/0015256 A1 | 1/2005 | Kargman |
| 2005/0021331 A1 | 1/2005 | Huang |
| 2005/0021334 A1 | 1/2005 | Iwahashi |
| 2005/0021470 A1 | 1/2005 | Martin |
| 2005/0021826 A1 | 1/2005 | Kumar |
| 2005/0033574 A1 | 2/2005 | Kim |
| 2005/0033582 A1 | 2/2005 | Gadd |
| 2005/0043940 A1 | 2/2005 | Elder |
| 2005/0080632 A1 | 4/2005 | Endo |
| 2005/0114116 A1 | 5/2005 | Fiedler |
| 2005/0125232 A1 | 6/2005 | Gadd |
| 2005/0131673 A1 | 6/2005 | Koizumi |
| 2005/0137850 A1 | 6/2005 | Odell |
| 2005/0137877 A1 | 6/2005 | Oesterling |
| 2005/0143994 A1 | 6/2005 | Mori |
| 2005/0144013 A1 | 6/2005 | Fujimoto |
| 2005/0144187 A1 | 6/2005 | Che |
| 2005/0149319 A1 | 7/2005 | Honda |
| 2005/0216254 A1 | 9/2005 | Gupta |
| 2005/0222763 A1 | 10/2005 | Uyeki |
| 2005/0234637 A1 | 10/2005 | Obradovich |
| 2005/0234727 A1 | 10/2005 | Chiu |
| 2005/0246174 A1 | 11/2005 | DeGolia |
| 2005/0283364 A1 | 12/2005 | Longe |
| 2005/0283752 A1 | 12/2005 | Fruchter |
| 2006/0041431 A1 | 2/2006 | Maes |
| 2006/0046740 A1 | 3/2006 | Johnson |
| 2006/0047509 A1 | 3/2006 | Ding |
| 2006/0072738 A1 | 4/2006 | Louis |
| 2006/0074671 A1 | 4/2006 | Farmaner |
| 2006/0100851 A1 | 5/2006 | Schonebeck |
| 2006/0130002 A1 | 6/2006 | Hirayama |
| 2006/0182085 A1 | 8/2006 | Sweeney |
| 2006/0206310 A1 | 9/2006 | Ravikumar |
| 2006/0217133 A1 | 9/2006 | Christenson |
| 2006/0242017 A1 | 10/2006 | Libes |
| 2006/0253247 A1 | 11/2006 | de Silva |
| 2006/0253281 A1 | 11/2006 | Letzt |
| 2006/0285662 A1 | 12/2006 | Yin |
| 2007/0033005 A1 | 2/2007 | Cristo |
| 2007/0033020 A1 | 2/2007 | Francois |
| 2007/0033526 A1 | 2/2007 | Thompson |
| 2007/0038436 A1 | 2/2007 | Cristo |
| 2007/0038445 A1 | 2/2007 | Helbing |
| 2007/0043569 A1 | 2/2007 | Potter |
| 2007/0043574 A1 | 2/2007 | Coffman |
| 2007/0043868 A1 | 2/2007 | Kumar |
| 2007/0050191 A1 | 3/2007 | Weider |
| 2007/0050279 A1 | 3/2007 | Huang |
| 2007/0055525 A1 | 3/2007 | Kennewick |
| 2007/0061067 A1 | 3/2007 | Zeinstra |
| 2007/0061735 A1 | 3/2007 | Hoffberg |
| 2007/0067310 A1 | 3/2007 | Gupta |
| 2007/0073544 A1 | 3/2007 | Millett |
| 2007/0078708 A1 | 4/2007 | Yu |
| 2007/0078709 A1 | 4/2007 | Rajaram |
| 2007/0078814 A1 | 4/2007 | Flowers |
| 2007/0094003 A1 | 4/2007 | Huang |
| 2007/0112555 A1 | 5/2007 | Lavi |
| 2007/0112630 A1 | 5/2007 | Lau |
| 2007/0118357 A1 | 5/2007 | Kasravi |
| 2007/0124057 A1 | 5/2007 | Prieto |
| 2007/0135101 A1 | 6/2007 | Ramati |
| 2007/0146833 A1 | 6/2007 | Satomi |
| 2007/0162296 A1 | 7/2007 | Altberg |
| 2007/0174258 A1 | 7/2007 | Jones |
| 2007/0179778 A1 | 8/2007 | Gong |
| 2007/0185859 A1 | 8/2007 | Flowers |
| 2007/0186165 A1 | 8/2007 | Maislos |
| 2007/0192309 A1 | 8/2007 | Fischer |
| 2007/0198267 A1 | 8/2007 | Jones |
| 2007/0203736 A1 | 8/2007 | Ashton |
| 2007/0208732 A1 | 9/2007 | Flowers |
| 2007/0214182 A1 | 9/2007 | Rosenberg |
| 2007/0250901 A1 | 10/2007 | McIntire |
| 2007/0265850 A1 | 11/2007 | Kennewick |
| 2007/0266257 A1 | 11/2007 | Camaisa |
| 2007/0276651 A1 | 11/2007 | Bliss |
| 2007/0299824 A1 | 12/2007 | Pan |
| 2008/0014908 A1 | 1/2008 | Vasant |
| 2008/0034032 A1 | 2/2008 | Healey |
| 2008/0046311 A1 | 2/2008 | Shahine |
| 2008/0059188 A1 | 3/2008 | Konopka |
| 2008/0065386 A1 | 3/2008 | Cross |
| 2008/0065389 A1 | 3/2008 | Cross |
| 2008/0065390 A1 | 3/2008 | Ativanichayaphong |
| 2008/0086455 A1 | 4/2008 | Meisels |
| 2008/0091406 A1 | 4/2008 | Baldwin |
| 2008/0103761 A1 | 5/2008 | Printz |
| 2008/0103781 A1 | 5/2008 | Wasson |
| 2008/0104071 A1 | 5/2008 | Pragada |
| 2008/0109285 A1 | 5/2008 | Reuther |
| 2008/0115163 A1 | 5/2008 | Gilboa |
| 2008/0126091 A1 | 5/2008 | Clark |
| 2008/0126284 A1* | 5/2008 | Forbes ............... G06K 9/00624 706/46 |
| 2008/0133215 A1 | 6/2008 | Sarukkai |
| 2008/0140385 A1 | 6/2008 | Mahajan |
| 2008/0147396 A1 | 6/2008 | Wang |
| 2008/0147410 A1 | 6/2008 | Odinak |
| 2008/0147637 A1 | 6/2008 | Li |
| 2008/0154604 A1 | 6/2008 | Sathish |
| 2008/0162471 A1 | 7/2008 | Bernard |
| 2008/0177530 A1 | 7/2008 | Cross |
| 2008/0189110 A1 | 8/2008 | Freeman |
| 2008/0189187 A1 | 8/2008 | Hao |
| 2008/0228496 A1 | 9/2008 | Yu |
| 2008/0235023 A1 | 9/2008 | Kennewick |
| 2008/0235027 A1 | 9/2008 | Cross |
| 2008/0269958 A1* | 10/2008 | Filev ..................... B60W 50/10 701/1 |
| 2008/0270135 A1 | 10/2008 | Goel |
| 2008/0294437 A1 | 11/2008 | Nakano |
| 2008/0294994 A1 | 11/2008 | Kruger |
| 2008/0319751 A1 | 12/2008 | Kennewick |
| 2009/0006077 A1 | 1/2009 | Keaveney |
| 2009/0024476 A1 | 1/2009 | Baar |
| 2009/0030686 A1 | 1/2009 | Weng |
| 2009/0052635 A1 | 2/2009 | Jones |
| 2009/0055176 A1 | 2/2009 | Hu |
| 2009/0067599 A1 | 3/2009 | Agarwal |
| 2009/0076827 A1 | 3/2009 | Bulitta |
| 2009/0106029 A1 | 4/2009 | DeLine |
| 2009/0117885 A1 | 5/2009 | Roth |
| 2009/0144131 A1 | 6/2009 | Chiu |
| 2009/0144271 A1 | 6/2009 | Richardson |
| 2009/0150156 A1 | 6/2009 | Kennewick |
| 2009/0157382 A1 | 6/2009 | Bar |
| 2009/0164216 A1 | 6/2009 | Chengalvarayan |
| 2009/0171664 A1 | 7/2009 | Kennewick |
| 2009/0171912 A1 | 7/2009 | Nash |
| 2009/0197582 A1 | 8/2009 | Lewis |
| 2009/0216540 A1 | 8/2009 | Tessel |
| 2009/0248605 A1 | 10/2009 | Mitchell |
| 2009/0259561 A1 | 10/2009 | Boys |
| 2009/0259646 A1 | 10/2009 | Fujita |
| 2009/0265163 A1 | 10/2009 | Li |
| 2009/0271194 A1 | 10/2009 | Davis |
| 2009/0273563 A1 | 11/2009 | Pryor |
| 2009/0276700 A1 | 11/2009 | Anderson |
| 2009/0287680 A1 | 11/2009 | Paek |
| 2009/0299745 A1 | 12/2009 | Kennewick |
| 2009/0299857 A1 | 12/2009 | Brubaker |
| 2009/0304161 A1 | 12/2009 | Pettyjohn |
| 2009/0307031 A1 | 12/2009 | Winkler |
| 2009/0313026 A1 | 12/2009 | Coffman |
| 2009/0319517 A1 | 12/2009 | Guha |
| 2010/0023320 A1 | 1/2010 | Cristo |
| 2010/0023331 A1 | 1/2010 | Duta |
| 2010/0029261 A1 | 2/2010 | Mikkelsen |
| 2010/0036967 A1 | 2/2010 | Caine |

(56) References Cited

U.S. PATENT DOCUMENTS

| | | |
|---|---|---|
| 2010/0049501 A1 | 2/2010 | Kennewick |
| 2010/0049514 A1 | 2/2010 | Kennewick |
| 2010/0057443 A1 | 3/2010 | Cristo |
| 2010/0063880 A1 | 3/2010 | Atsmon |
| 2010/0064025 A1 | 3/2010 | Nelimarkka |
| 2010/0094707 A1 | 4/2010 | Freer |
| 2010/0138300 A1 | 6/2010 | Wallis |
| 2010/0145700 A1 | 6/2010 | Kennewick |
| 2010/0185512 A1 | 7/2010 | Borger |
| 2010/0191856 A1* | 7/2010 | Gupta .............. H04L 29/12066 709/228 |
| 2010/0204986 A1 | 8/2010 | Kennewick |
| 2010/0204994 A1 | 8/2010 | Kennewick |
| 2010/0217604 A1 | 8/2010 | Baldwin |
| 2010/0268536 A1 | 10/2010 | Suendermann |
| 2010/0286985 A1 | 11/2010 | Kennewick |
| 2010/0299142 A1 | 11/2010 | Freeman |
| 2010/0312547 A1* | 12/2010 | Van Os .................. G10L 15/26 704/9 |
| 2010/0312566 A1 | 12/2010 | Odinak |
| 2010/0331064 A1 | 12/2010 | Michelstein |
| 2011/0022393 A1 | 1/2011 | Waller |
| 2011/0106527 A1 | 5/2011 | Chiu |
| 2011/0112827 A1 | 5/2011 | Kennewick |
| 2011/0112921 A1 | 5/2011 | Kennewick |
| 2011/0119049 A1 | 5/2011 | Ylonen |
| 2011/0131036 A1 | 6/2011 | DiCristo |
| 2011/0131045 A1 | 6/2011 | Cristo |
| 2011/0231182 A1 | 9/2011 | Weider |
| 2011/0231188 A1 | 9/2011 | Kennewick |
| 2011/0307167 A1 | 12/2011 | Taschereau |
| 2012/0022857 A1 | 1/2012 | Baldwin |
| 2012/0041753 A1 | 2/2012 | Dymetman |
| 2012/0046935 A1 | 2/2012 | Nagao |
| 2012/0101809 A1 | 4/2012 | Kennewick |
| 2012/0101810 A1 | 4/2012 | Kennewick |
| 2012/0109753 A1 | 5/2012 | Kennewick |
| 2012/0150620 A1 | 6/2012 | Mandyam |
| 2012/0150636 A1 | 6/2012 | Freeman |
| 2012/0239498 A1 | 9/2012 | Ramer |
| 2012/0240060 A1 | 9/2012 | Pennington |
| 2012/0265528 A1 | 10/2012 | Gruber |
| 2012/0278073 A1 | 11/2012 | Weider |
| 2013/0006734 A1 | 1/2013 | Ocko |
| 2013/0054228 A1 | 2/2013 | Baldwin |
| 2013/0060625 A1 | 3/2013 | Davis |
| 2013/0080177 A1 | 3/2013 | Chen |
| 2013/0211710 A1 | 8/2013 | Kennewick |
| 2013/0253929 A1 | 9/2013 | Weider |
| 2013/0254314 A1 | 9/2013 | Chow |
| 2013/0297293 A1 | 11/2013 | Cristo |
| 2013/0304473 A1 | 11/2013 | Baldwin |
| 2013/0311324 A1 | 11/2013 | Stoll |
| 2013/0332454 A1 | 12/2013 | Stuhec |
| 2013/0339022 A1 | 12/2013 | Baldwin |
| 2014/0006951 A1 | 1/2014 | Hunter |
| 2014/0012577 A1 | 1/2014 | Freeman |
| 2014/0025371 A1* | 1/2014 | Min ...................... G06Q 10/00 704/9 |
| 2014/0108013 A1 | 4/2014 | Cristo |
| 2014/0156278 A1 | 6/2014 | Kennewick |
| 2014/0195238 A1 | 7/2014 | Terao |
| 2014/0236575 A1 | 8/2014 | Tur |
| 2014/0249821 A1 | 9/2014 | Kennewick |
| 2014/0249822 A1 | 9/2014 | Baldwin |
| 2014/0278413 A1 | 9/2014 | Pitschel |
| 2014/0278416 A1 | 9/2014 | Schuster |
| 2014/0288934 A1 | 9/2014 | Kennewick |
| 2014/0337007 A1 | 11/2014 | Waibel |
| 2014/0365222 A1 | 12/2014 | Weider |
| 2015/0019211 A1 | 1/2015 | Simard |
| 2015/0019217 A1 | 1/2015 | Cristo |
| 2015/0019227 A1 | 1/2015 | Anandarajah |
| 2015/0066479 A1 | 3/2015 | Pasupalak |
| 2015/0066627 A1 | 3/2015 | Freeman |
| 2015/0073910 A1 | 3/2015 | Kennewick |
| 2015/0095159 A1 | 4/2015 | Kennewick |
| 2015/0142447 A1 | 5/2015 | Kennewick |
| 2015/0170641 A1 | 6/2015 | Kennewick |
| 2015/0193379 A1 | 7/2015 | Mehta |
| 2015/0228276 A1 | 8/2015 | Baldwin |
| 2015/0293917 A1 | 10/2015 | Bufe |
| 2015/0348544 A1 | 12/2015 | Baldwin |
| 2015/0348551 A1 | 12/2015 | Gruber |
| 2015/0364133 A1 | 12/2015 | Freeman |
| 2016/0049152 A1 | 2/2016 | Kennewick |
| 2016/0078482 A1 | 3/2016 | Kennewick |
| 2016/0078491 A1 | 3/2016 | Kennewick |
| 2016/0078504 A1 | 3/2016 | Kennewick |
| 2016/0078773 A1 | 3/2016 | Carter |
| 2016/0110347 A1 | 4/2016 | Kennewick |
| 2016/0148612 A1 | 5/2016 | Guo |
| 2016/0188292 A1 | 6/2016 | Carter |
| 2016/0188573 A1 | 6/2016 | Tang |
| 2016/0217785 A1 | 7/2016 | Kennewick |
| 2016/0335676 A1 | 11/2016 | Freeman |

FOREIGN PATENT DOCUMENTS

| | | |
|---|---|---|
| EP | 1320043 A2 | 6/2003 |
| EP | 1646037 | 4/2006 |
| JP | H08263258 | 10/1996 |
| JP | H11249773 | 9/1999 |
| JP | 2001071289 | 3/2001 |
| JP | 2006146881 | 6/2006 |
| JP | 2008027454 | 2/2008 |
| JP | 2008058465 | 3/2008 |
| JP | 2008139928 | 6/2008 |
| JP | 2011504304 | 2/2011 |
| JP | 2012518847 | 8/2012 |
| WO | 9946763 | 9/1999 |
| WO | 0021232 | 1/2000 |
| WO | 0046792 | 1/2000 |
| WO | 0129742 | 4/2001 |
| WO | 0171609 A2 | 9/2001 |
| WO | 0178065 | 10/2001 |
| WO | 2004072954 | 1/2004 |
| WO | 2005010702 A2 | 2/2005 |
| WO | 2007019318 | 1/2007 |
| WO | 2007021587 | 1/2007 |
| WO | 2007027546 | 1/2007 |
| WO | 2007027989 | 1/2007 |
| WO | 2008098039 | 1/2008 |
| WO | 2008118195 | 1/2008 |
| WO | 2009075912 | 1/2009 |
| WO | 2009145796 | 1/2009 |
| WO | 2009111721 | 9/2009 |
| WO | 2010096752 | 1/2010 |
| WO | 2016044290 | 3/2016 |
| WO | 2016044316 | 3/2016 |
| WO | 2016044319 | 3/2016 |
| WO | 2016044321 | 3/2016 |
| WO | 2016061309 | 4/2016 |

OTHER PUBLICATIONS

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages Bazzi, Issam et al., "Heterogeneous Lexical Units for Automatic Speech Recognition: Preliminary Investigations", Proceedings of the IEEE International Conference on Acoustics, Speech, and Signal Processing, vol. 3, Jun. 5-9, 2000, XP010507574, pp. 1257-1260.

Belvin, Robert, et al., "Development of the HRL Route Navigation Dialogue System", Proceedings of the First International Conference on Human Language Technology Research, San Diego, 2001, pp. 1-5.

Chai et al., "MIND: A Semantics-Based Multimodal Interpretation Framework for Conversational Systems", Proceedings of the Inter-

(56) References Cited

OTHER PUBLICATIONS national CLASS Workshop on Natural, Intelligent and Effective Interaction in Multimodal Dialogue Systems, Jun. 2002, pp. 37-46.
Cheyer et al., "Multimodal Maps: An Agent-Based Approach", International Conference on Cooperative Multimodal Communication (CMC/95), May 24-26, 1995, pp. 111-121.
El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.
Elio et al., "On Abstract Task Models and Conversation Policies" in Workshop on Specifying and Implementing Conversation Policies, Autonomous Agents '99, Seattle, 1999, 10 pages.
Kirchhoff, Katrin, "Syllable-Level Desynchronisation of Phonetic Features for Speech Recognition", Proceedings of the Fourth International Conference on Spoken Language, 1996, ICSLP 96, vol. 4, IEEE, 1996, 3 pages.
Kuhn, Thomas, et al., "Hybrid In-Car Speech Recognition for Mobile Multimedia Applications", Vehicular Technology Conference, IEEE, Jul. 1999, pp. 2009-2013.
Lin, Bor-shen, et al., "A Distributed Architecture for Cooperative Spoken Dialogue Agents with Coherent Dialogue State and History", ASRU'99, 1999, 4 pages.
Lind, R., et al., The Network Vehicle—A Glimpse into the Future of Mobile Multi-Media, IEEE Aerosp. Electron. Systems Magazine, vol. 14, No. 9, Sep. 1999, pp. 27-32.
Mao, Mark Z. "Automatic Training Set Segmentation for Multi-Pass Speech Recognition", Department of Electrical Engineering, Stanford University, CA, copyright 2005, IEEE, pp. 1-685 to 1-688.
O'Shaughnessy, Douglas, "Interacting with Computers by Voice: Automatic Speech Recognition and Synthesis", Proceedings of the IEEE, vol. 91, No. 9, Sep. 1, 2003, XP011100665. pp. 1272-1305.
Reuters, "IBM to Enable Honda Drivers to Talk to Cars", Charles Schwab & Co., Inc., Jul. 28, 2002, 1 page.
Turunen, "Adaptive Interaction Methods in Speech User Interfaces", Conference on Human Factors in Computing Systems, Seattle, Washington, 2001, pp. 91-92.
Vanhoucke, Vincent, "Confidence Scoring and Rejection Using Multi-Pass Speech Recognition", Nuance Communications, Menlo Park, CA, 2005, 4 pages.
Weng, Fuliang, et al., "Efficient Lattice Representation and Generation", Speech Technology and Research Laboratory, SRI International, Menlo Park, CA, 1998, 4 pages.
Wu, Su-Lin, et al., "Incorporating Information from Syllable-Length Time Scales into Automatic Speech Recognition", Proceedings of the 1998 IEEE International Conference on Acoustics, Speech and Signal Processing, 1998, vol. 2, IEEE, 1998, 4 pages.
Wu, Su-Lin, et al., "Integrating Syllable Boundary Information into Speech Recognition", IEEE International Conference on Acoustics, Speech, and Signal Processing, ICASSP-97, 1997, vol. 2, IEEE, 1997, 4 pages.
Zhao, Yilin, "Telematics: Safe and Fun Driving", IEEE Intelligent Systems, vol. 17, Issue 1, 2002, pp. 10-14.
Davis, Z., et al., A Personal Handheld Multi-Modal Shopping Assistant, IEEE, 2006, 9 pages.

\* cited by examiner

SYSTEM AND METHOD OF PROVIDING INTENT PREDICTIONS FOR AN UTTERANCE PRIOR TO A SYSTEM DETECTION OF AN END OF THE UTTERANCE

CROSS REFERENCE TO RELATED APPLICATION

This application claims the benefit of U.S. Provisional Patent Application Ser. No. 62/085,015 filed Nov. 26, 2014 entitled "System and Method of Providing Intent Predictions for an Utterance Prior to a System Detection of an End of the Utterance," the entirety of which is incorporated herein by reference.

FIELD OF THE INVENTION

The invention relates to systems and methods of providing improved natural language processing, for example, by providing intent predictions for an utterance prior to a system detection of an end of the utterance.

BACKGROUND OF THE INVENTION

With the advent of technology, consumer electronic devices have emerged to become nearly ubiquitous in the everyday lives of many people. Many of these devices offer users access to a plethora of features, including the ability to initiate requests (e.g., commands, queries, etc.) using speech. A typical speech-based system that enables speech-initiated requests generally waits until an end of an utterance is detected before processing the utterance to recognize the words of the utterance, determine an intent of the user in speaking the utterance, and generate a user request. As such, the typical speech-based system may remain idle (with respect to the processing of the utterance) until the end of the utterance is detected, resulting in unnecessary delay before a response to the utterance can be provided to a user. These and other drawbacks exist.

SUMMARY OF THE INVENTION

The invention relates to systems and methods of providing improved natural language processing. As an example, natural language processing may be facilitated by providing intent predictions for a natural language utterance prior to a system detection of an end of the utterance (e.g., continuous intent prediction as utterances are being spoken), predicting "full" utterances based on partial utterances and/or previous full utterances, inferring words of portions of an utterance that a user has not yet spoken, pre-fetching content based on predictions with regard to an utterance, or performing other operations.

In an implementation, receipt and processing of portions of a natural language utterance may be performed in parallel. As an example, as another portion of the utterance is being received, one or more portions of the utterance that have already been received may be processed to: (1) recognize words of the already-received portions, (2) predict an intent associated with the utterance based on the already-received portions, (3) generate user requests based on the already-received portions, or (4) perform other operations even if other portions of the utterance have not yet been received. For example, new predictions and/or updates to prior predictions with regard to the utterance (e.g., prediction of what the user intends to say, prediction of what the user intends to accomplish by speaking the utterance (or portions thereof), etc.) may be performed as additional portions of the utterance are received. User requests may be generated based on the new/updated predictions and/or content related to the user requests may be obtained. One or more of the foregoing operations may, for example, be performed prior to system detection of an end of the utterance. As such, unnecessary delay in identifying (and generating) one or more user requests of the user, generating responses to the user requests, or performing other related operations on behalf of a user may be reduced.

In an implementation, end of utterance detection may be performed based on a semantic processing of recognized words of an utterance. As an example, speech recognition may be performed on one or more portions of the utterance to recognize one or more words of the portions of the utterance. Semantic processing may be performed on the recognized words of the utterance to detect an end of the utterance. In another implementation, end of utterance detection may be performed based on silence detection. As an example, an end of an utterance may be determined when there has been an absence of speech (e.g., when only non-speech noise is detected) for at least a predetermined threshold time period.

In an implementation, an intent associated with a natural language utterance of a user may be predicted prior to a system detection of an end of the utterance. Based on the predicted intent, one or more words of a portion of the utterance that the user has not yet spoken (e.g., an utterance portion that the user is predicted to intend to speak) may be inferred. A set of words may be provided for presentation to the user where the set of words comprises one or more recognized words of a portion of the utterance spoken by the user and/or the inferred words of the non-yet-spoken portion of the utterance. As an example, the set of words (e.g., comprising the recognized words of the spoken portion, the inferred words of the not-yet-spoken portion, etc.) may be provided prior to a system detection of an end of the utterance.

In an implementation, one or more sets of inferred words of a portion of a natural language utterance that the user has not yet spoken may be provided for presentation to a user, for example, to enable the user to confirm that a presented set of inferred words is what the user intended to say and/or to select at least one of multiple presented sets of inferred words as words that the user intended to say (but has not spoken). As an example, one or more sets of words may be inferred based on one or more predicted intents associated with the utterance. The user's confirmation/selection of at least one of the presented sets of words may, for example, indicate whether and/or which of the predicted intents most accurately corresponds to the user's intent in speaking the utterance (or a portion thereof). In an implementation, one or more requests may be generated based on the user's confirmation/selection of a presented set of inferred words.

In an implementation, pre-fetching of content (or results) related to a natural language utterance may be initiated. In some implementations, multiple predictions regarding what the user intended when speaking the utterance may be made, and user requests may be generated based on the predicted intents, respectively. For each of the user requests involving requests for data (e.g., user queries, commands to load a content item, or other user requests), content may be obtained based on the user request and/or stored (e.g., cached for quick access). The content may be obtained, stored, and/or provided for presentation to the user, for example, prior to settling on a predicted intent as what the user intended in speaking the utterance, prior to detecting an end of the utterance, etc.

In some implementations, the content related to each of the user requests may be stored (and not necessarily provided for presentation to the user). Upon deciding that one or more of the predicted intents correspond to an intent of the user in speaking the utterance, a response for presentation to the user may be generated using the content related to a user request associated with at least one of the corresponding predicted intents. A predicted intent may, for example, be determined to correspond to an intent of the user in speaking the utterance responsive to the predicted intent satisfying a certain threshold level of confidence (e.g., satisfying a threshold confidence score), responsive to the predicted intent being selected as the most accurate prediction among a set of predicted intents, etc.

Various other aspects of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other instances, well-known structures and devices are shown in block diagram form in order to avoid unnecessarily obscuring the implementations of the invention.

Figure 1:
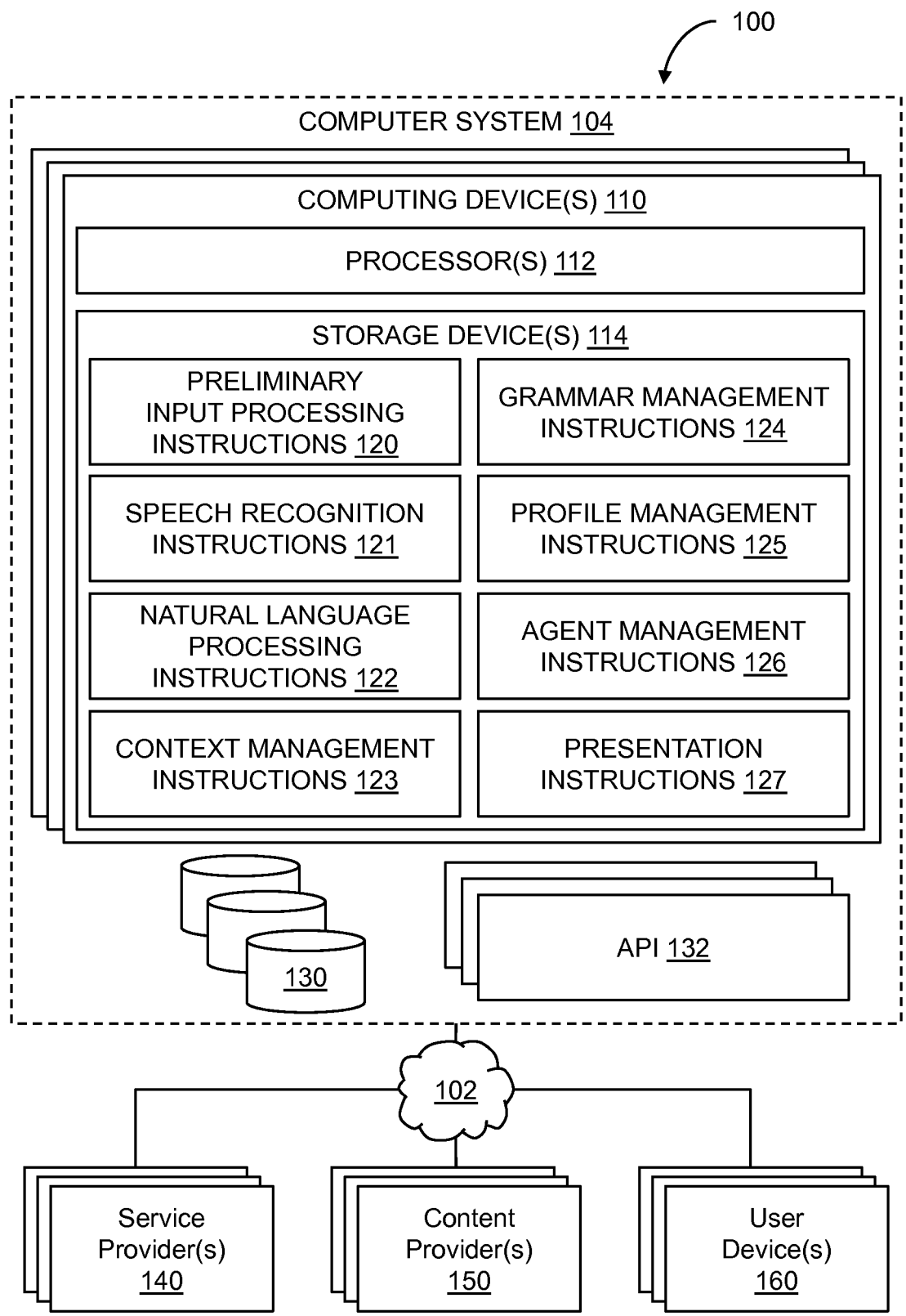
FIG. 1 illustrates a system for facilitating natural language processing, in accordance with one or more implementations of the invention.

FIG. 1 illustrates a system 100 for facilitating natural language processing, in accordance with an implementation of the invention. It should be noted that, while implementations described herein are with respect to processing of natural language utterances, such implementations may be applied to processing of other natural language inputs. As an example, intent prediction may be performed with respect to processing of visual inputs (or gestures) representing sign language communication using one or more aspects of implementations described herein for intent prediction with respect to processing of natural language utterances. In various use cases, for instance, (1) intents of a user in providing visual communication (a "non-verbal utterance" which may be continuously streamed and processed in parallel) may be predicted/updated, (2) recognized words of communicated portions of the non-verbal utterance and/or inferred words of not-yet-communicated portions of the non-verbal utterance may be provided for presentation to the user, (3) content related to the predicted intents (or associated requests) may be pre-fetched, (4) an end of the non-verbal utterance may be detected, or (5) other operations described herein with respect to processing of natural language utterance may be adapted and performed for processing of visual communication.

In an implementation, system 100 may receive one or more portions of a natural language utterance spoken by a user. System 100 may process the received portions of the utterance to predict an intent associated with the utterance and then generate one or more user requests based on the predicted intent. The user requests may comprise a command, a query, or other user request. The receipt of the portions of the utterance, the prediction of an intent associated with the utterance, the generation of the user requests based on the predicted intent, or other operations may be performed prior to system 100 detecting an end of the utterance (e.g., it may not be necessary to wait until the user speaks the entire utterance before performing one or more of the foregoing operations).

As an example, system 100 may receive and process portions of a natural language utterance in parallel. In one use case, as another portion of the utterance is being received, system 100 may process one or more portions of the utterance that have already been received to: (1) recognize words of the already-received portions, (2) predict an intent associated with the utterance based on the already-received portions, (3) generate user requests based on the already-received portions, or (4) perform other operations even if other portions of the utterance have not yet been received. System 100 may, for example, continuously make new predictions and/or update prior predictions with regard to the utterance (e.g., prediction of what the user intends to say, prediction of what the user intends to accomplish by speaking the utterance (or portions thereof), etc.) as additional portions of the utterance are received, generate user requests based on the new/updated predictions, obtain content related to the user requests, or perform other operations prior to detecting an end of the utterance.

In an implementation, system 100 may detect an end of an utterance based on a semantic processing of recognized words of the utterance. As an example, system 100 may perform speech recognition on one or more portions of the utterance to recognize one or more words of the portions of the utterance and perform semantic processing on the recognized words of the utterance to detect the end of the utterance. In another implementation, system 100 may detect an end of a natural language utterance based on silence detection. As an example, system 100 may determine that an end of utterance has occurred when there has been an absence of speech (e.g., when only non-speech noise is detected) for at least a predetermined threshold time period.

In an implementation, system 100 may predict an intent associated with a natural language utterance of a user prior to system 100 detecting an end of the utterance. Based on the predicted intent, system 100 may infer one or more words of a portion of the utterance that the user has not yet spoken (e.g., an utterance portion that the user is predicted to intend to speak). System 100 may then provide a set of words for presentation to the user that comprises one or more recognized words of a portion of the utterance spoken by the user and/or the inferred words of the non-yet-spoken portion of the utterance. As an example, the set of words (e.g., comprising the recognized words of the spoken portion, the inferred words of the not-yet-spoken portion, etc.) may be provided prior to system 100 detecting an end of the utterance.

In an implementation, system 100 may provide one or more sets of inferred words of a portion of a natural language utterance that the user has not yet spoken for presentation to a user, for example, to enable the user to confirm that a presented set of inferred words is what the user intended to say and/or to select at least one of multiple presented sets of inferred words as words that the user intended to say (but has not spoken). As an example, one or more sets of words may be inferred based on one or more predicted intents associated with the utterance. The user's confirmation/selection of at least one of the presented sets of words may, for example, indicate to system 100 whether and/or which of the predicted intents most accurately corresponds to the user's intent in speaking the utterance (or a portion thereof). In an implementation, system 100 may generate one or more requests based on the user's confirmation/selection of a presented set of inferred words. As an example, upon determining that a particular predicted intent corresponds to the user's intent in speaking the utterance based on the user's confirmation/selection, a user request may be generated based on the particular predicted intent.

In an implementation, system 100 may initiate pre-fetching of content (or results) related to a natural language utterance. In some implementations, system 100 may make multiple predictions regarding what the user intended when speaking the utterance, and generate user requests based on the predicted intents, respectively. For each of the user requests involving requests for data (e.g., user queries, commands to load a content item, or other user requests), content may be obtained based on the user request and/or stored (e.g., cached for quick access). The content may be obtained, stored, and/or provided for presentation to the user, for example, prior to system 100 settling on a predicted intent as what the user intended in speaking the utterance, prior to system 100 detecting an end of the utterance, etc.

In some implementations, system 100 may obtain and store the content related to each of the user requests. Upon deciding that one or more of the predicted intents correspond to an intent of the user in speaking the utterance, system 100 may generate a response for presentation to the user using the content related to a user request associated with at least one of the corresponding predicted intents (e.g., a user request generated based on at least one of the predicted intents that are determined by system 100 to correspond to an intent of the user in speaking the utterance). A predicted intent may, for example, be determined to correspond to an intent of the user in speaking the utterance responsive to the predicted intent satisfying a certain threshold level of confidence (e.g., satisfying a threshold confidence score), responsive to the predicted intent being selected as the most accurate prediction among a set of predicted intents, etc.

In an implementation, system 100 may predict subsequent utterances of a user. One or more user requests may be generated based on the prediction of the subsequent utterances. In some implementations, system 100 may predict a subsequent utterance of a user based on a prior utterance of the user, prior utterances of other users that relate to the user's prior utterance, or other information (e.g., the user's body language, heartbeat, location, current time, etc.). As an example, system 100 may determine what the other users previously said after speaking utterances similar to an utterance that the user just recently spoke (e.g., the utterances of the other users that occurred closely in time after the other users spoke the utterances similar to the user's recently-spoken utterance). The utterances spoken by the other users (subsequent to them speaking the utterances similar to the user's recently-spoken utterance) may be utilized to predict what the user will say (e.g., the user just said X, other users say Y immediately after saying X, therefore, the user will say Y). In one use case, the prediction of the subsequent utterance of the user may be performed without the user speaking any portion of the subsequent utterance. The predicted utterance may, for example, be provided for presentation to the user to enable the user to confirm that the presented prediction is an accurate representation of what the user was going to say and/or to guide the user in providing his/her next user request via speech.

In some implementations, system 100 may predict a subsequent utterance of a user based on predictions regarding a current utterance being spoken by the user. As an example, system 100 may predict the subsequent utterance based on recognized words of portions of an utterance that the user has spoken, inferred words of portions of the utterance that the user did not speak (but is predicted to have intended to say), results obtained in accordance with such predictions, or other information.

In an implementation, system 100 may determine context information for interpreting and/or reinterpreting one or more other natural language utterances (e.g., prior utterances, subsequent utterances, etc.) based on predictions regarding a current utterance being spoken by the user. System 100 may then interpret and/or reinterpret the other utterances based on the context information. As an example, system 100 may determine the context information based on recognized words of portions of an utterance that the user has spoken, inferred words of portions of the utterance that the user did not speak (but is predicted to have intended to say), results obtained in accordance with such predictions, or other information.

Other uses of system 100 are described herein, and still others will be apparent to those having skill in the art. Having described a high-level overview of some of the system operations (or functions), attention will now be turned to various system components that facilitate these and other operations.

System Components

System 100 may include a computer system 104, one or more service providers 140, one or more content providers 150, one or more user devices 160, and/or other components.

Computer system 104 may interface with service provider(s) 140 to allow users access to services offered by service provider(s) 140, interface with content provider(s) 150 to allow users to access content offered by content provider(s) 150, and provide various interfaces to user device(s) 160 so that users may interact with computer system 104.

To facilitate these and other operations (or functions), computer system 104 may include one or more computing devices 110. Each computing device 110 may include one or more processors 112, one or more storage devices 114, one or more databases 130, one or more APIs 132 (e.g., to interface with service provider(s) 140, content provider(s) 150, user device(s) 160, etc.), and/or other components.

Processor(s) 112 may be programmed with one or more computer program instructions, which may be stored in storage device(s) 114, to perform one or more operations. The one or more computer program instructions may comprise preliminary input processing instructions 120, speech recognition instructions 121, natural language processing instructions 122, context management instructions 123, grammar management instructions 124, profile management instructions 125, agent management instructions 126, presentation instructions 127, or other instructions.

In some implementations, a given user device 160 may comprise a given computing device 110. As such, the given user device 160 may comprise processor(s) 112 that are programmed with one or more computer program instructions, such as preliminary input processing instructions 120, speech recognition instructions 121, natural language processing instructions 122, context management instructions 123, grammar management instructions 124, profile management instructions 125, agent management instructions 126, presentation instructions 127, or other instructions.

As used hereinafter, for convenience, the foregoing instructions will be described as performing an operation (or functions), when, in fact, the various instructions may program processor(s) 112 (and thus computer system 104) to perform the operation. It should be appreciated that the various instructions are described individually as discreet sets of instructions by way of illustration and not limitation, as two or more of the instructions may be combined.

User Input Processing

In an implementation, preliminary input processing instructions 120, speech recognition instructions 121, natural language processing instructions 122, or other instructions may process one or more user inputs of a user to determine one or more user requests that are intended by the user when the user provided the user inputs. The user inputs may comprise an auditory input (e.g., received via a microphone), a visual input (e.g., received via a camera), a tactile input (e.g., received via a touch sensor device), an olfactory input, a gustatory input, a keyboard input, a mouse input, or other user input.

In one use case, if the user input is a natural language utterance spoken by a user, the utterance may be processed by a speech recognition engine (e.g., speech recognition instructions 121) to recognize one or more words of the utterance. The recognized words may then be processed, along with context information associated with the user, by a natural language processing engine (e.g., natural language processing instructions 122) to determine a user request intended by the user when the user provided the utterance.

Example of Natural Language Processing System

Figure 2:
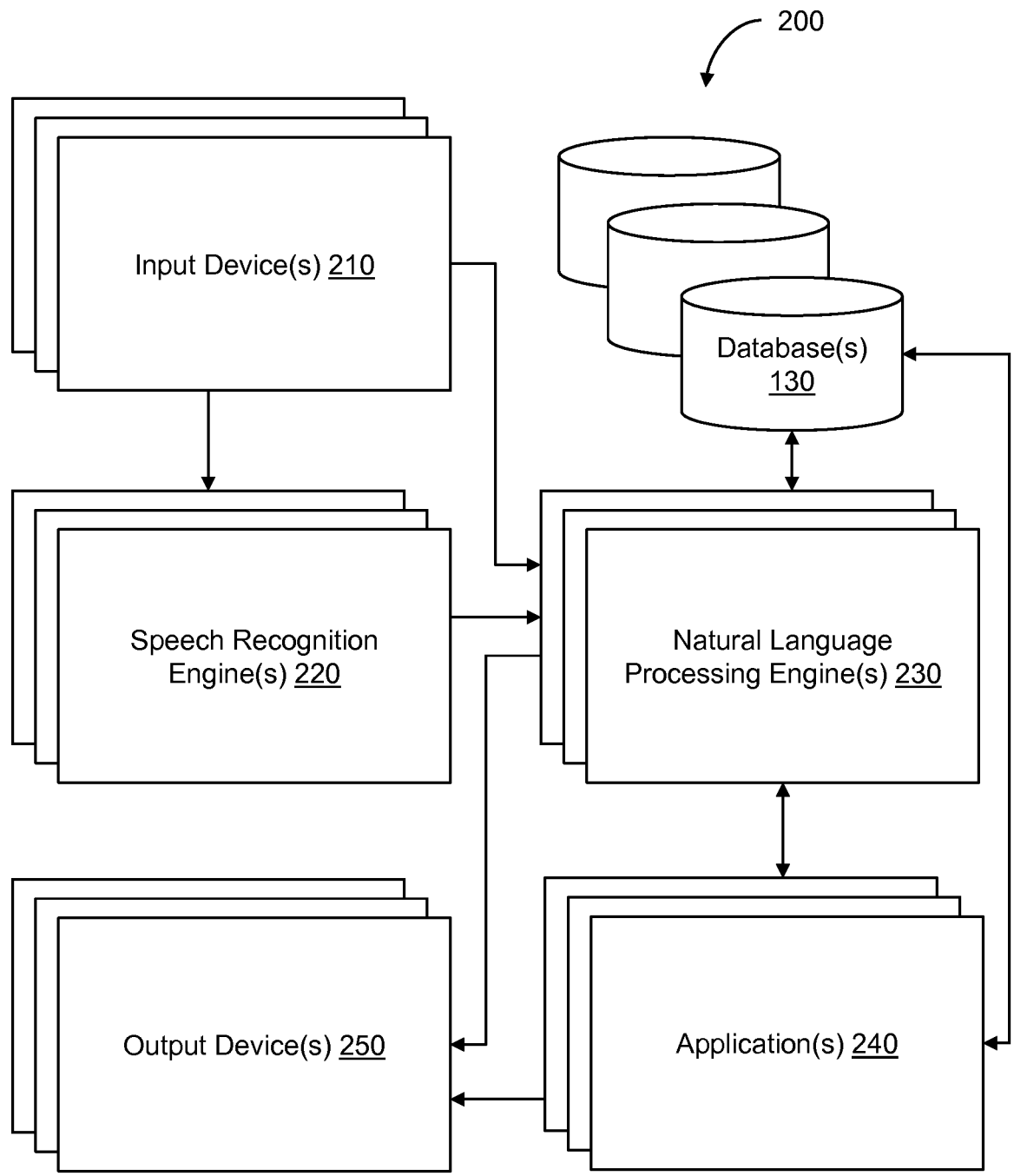
FIG. 2 illustrates another system for facilitating natural language processing, in accordance with one or more implementations of the invention.

FIG. 2 illustrates a system 200 for facilitating natural language processing, in accordance with an implementation of the invention. As shown in FIG. 2, system 200 may comprise input device(s) 210, speech recognition engine(s) 220, natural language processing engine(s) 230, application(s) 240, output device(s) 250, database(s) 130, or other components.

In an implementation, one or more components of system 200 may comprise one or more computer program instructions of FIG. 1 and/or processor(s) 112 programmed with the computer program instructions of FIG. 1. As an example, speech recognition engine(s) 220 and/or natural language processing engine(s) 230 may comprise preliminary input processing instructions 120, speech recognition instructions 121, natural language processing instructions 122, context management instructions 123, grammar management instructions 124, profile management instructions 125, or other instructions.

Input device(s) 210 may comprise an auditory input device (e.g., microphone), a visual input device (e.g., camera), a tactile input device (e.g., touch sensor), an olfactory input device, a gustatory input device, a keyboard, a mouse, or other input devices. Input received at input device(s) 210 may be provided to speech recognition engine(s) 220 and/or natural language processing engine(s) 230.

Speech recognition engine(s) 220 may process one or more inputs received from input device(s) 210 to recognize one or more words represented by the received inputs. As an example, with respect to auditory input, speech recognition engine(s) 220 may process an audio stream captured by an auditory input device to isolate segments of sound of the audio stream. The sound segments (or a representation of the sound segments) are then processed with one or more speech models (e.g., acoustic model, lexicon list, language model, etc.) to recognize one or more words of the received inputs. Upon recognition of the words of received inputs, the recognized words may then be provided to natural language processing engine(s) 230 for further processing. In other examples, natural language processing engine(s) 230 may process one or more other types of inputs (e.g., visual input representing sign language communication, gestures, or other forms of communication) to recognize one or more words represented by the other types of inputs.

Natural language processing engine(s) 230 may receive one or more inputs from input device(s) 210, speech recognition engine(s) 220, application(s) 240, database(s) 130, or other components. As an example, natural language processing engine(s) 230 may process inputs received from input device(s) 210, such as user inputs (e.g., voice, non-voice, etc.), location-based inputs (e.g., GPS data, cell ID, etc.), other sensor data input, or other inputs to determine context information associated with one or more user inputs. As another example, natural language processing engine(s) 230 may obtain grammar information, profile information, context information, or other information from database(s) 130. The obtained information (or context information determined based on inputs from input device(s) 210) may be processed to determine one or more user requests associated with one or more user inputs of a user. In yet another example, natural language processing engine(s) 230 may process one or more recognized words from speech recognition engine(s) 220 and other information (e.g., information from input device(s) 210, application(s) 240, and/or database(s) 130) to determine one or more user requests associated with one or more user inputs of a user.

In an implementation, natural language processing engine(s) 230 may solicit further inputs from a user by responding with a request for more information via output device(s) 250 if, for instance, a user request associated with a user input of a user cannot be determined with sufficient confidence, more information would helpful to process the user request, etc.

In an implementation, upon determination of a user request of a user, natural language processing engine(s) 230 may determine an application 240 suitable for executing the user request, and provide the user request to the application for further processing. In one scenario, the application 240 may provide one or more results of the user request to output device(s) 250 for presentation to the user.

In another scenario, the application 240 may provide the results of the user request to natural language processing engine(s) 230 for further processing. As an example, the results of the user request may comprise intermediate results that are provided as a parameter for another user request of the user that is to be executed at another application 240. As such, the natural language processing engine(s) 230 may generate the other user request based on the intermediate results, and provide the other user request to the other application 240. As another example, natural language processing engine(s) 230 may formulate a natural language response based on the results received from the application 240, and provide the natural language response to output device(s) 250 for presentation to the user.

In an implementation, a given application 240 may obtain profile information, account information, or other information from database(s) 130 to authenticate a user before executing a user request of the user. As an example, the application 240 may be part of a given service provider 140. As such, the application 240 may determine whether the user has access to one or more services associated with the application 240 before executing the user request on behalf of the user.

In an implementation, a given application 240 may obtain content from database(s) 130 and/or content provider(s) 150 to provide one or more results of a user request of a user. In one use case, where the user request comprises a command to play a media item (e.g., song, video clip, movie, etc.), and the application 240 comprises a media stream application, the application 240 may obtain the media item from a given content provider(s) 150 and stream the media item to output device(s) 250 for presentation to the user.

Intent Predictions Prior to End of Utterance Detection

In an implementation, upon receipt of information associated with a first portion of a natural language utterance, natural language processing instructions 122 may predict a first intent associated with the utterance. Upon receipt of information associated with a second portion of the utterance, natural language processing instructions 122 may predict a second intent associated with the utterance. The prediction of the first intent may, for instance, be based on the first utterance portion (e.g., based on the information associated with the first utterance portion), and the prediction of the second intent may be based on the first utterance portion and the second utterance portion (e.g., based on the information associated with the first and second utterance portions). One or more user requests may then be generated based on the first and/or second predicted intents. In a further implementation, the first intent and/or the second intent may be predicted prior to a detection of an end of the utterance. Among other benefits, for instance, performance of intent predictions without necessarily waiting for an end of utterance detection may reduce unnecessary delay in identifying (and generating) one or more user requests of the user, generating responses to the user requests, or performing other related operations on behalf of a user.

In an implementation, preliminary input processing instructions 120 may receive one or more portions of a natural language utterance of a user, and perform preliminary processing on the utterance portions. As an example, preliminary input processing instructions 120 may detect an end of the utterance by differentiating speech from non-speech noise in the utterance portions. Through this differentiation, for instance, a determination of whether and/or how long there has been an absence of speech (e.g., when only non-speech noise is detected) may be effectuated. Preliminary input processing instructions 120 may detect the end of the utterance based on a determination that there has been an absence of speech for at least a predetermined threshold time period.

As another example, preliminary input processing instructions 120 may perform encoding of the utterance portions prior to providing the utterance portions (e.g., the encoded version of the utterance portions) for speech recognition.

In an implementation, speech recognition instructions 121 may facilitate detection of an end of a natural language utterance. As an example, upon receipt of one or more portions of the utterance, speech recognition instructions 121 may perform speech recognition to recognize one or more words of the utterance portions, and perform semantic processing on the recognized words to detect an end of the utterance.

In one use case, even if a threshold amount of silence is reached while a user is speaking, the recognized words of portions of the utterance that the user has spoken may be utilized during the semantic processing to determine whether the utterance is actually complete (e.g., whether the user has finished speaking what he/she intends to communicate). In a further use case, natural language processing instructions 122 may identify a command before the end of the utterance is detected, and continue listening until the command's parameter list is full. However, if the threshold amount of silence is reached, the system may prompt the user for additional input relating to the parameters (e.g., if a city parameter has not yet been communicated, the user may be prompted to identity a city).

In an implementation, speech recognition instructions 121 may perform speech recognition on one or more portions of a natural language utterance of a user to recognize one or more words of the utterance portions, and provide the recognized words for further processing. Natural language processing instructions 122 may obtain context information for the utterance, and utilize the recognized words and the context information to predict an intent associated with the utterance. As an example, a first intent associated with the utterance may be predicted based on the recognized words of a first portion of the utterance and based on the context information. The context information may, for instance, comprise (1) information determined from a non-voice input (e.g., a tap/click on a point on a map to indicate a related location, a selection of an image, text, or other item to indicate a related context, or other input provided by a user prior to, contemporaneously with, or subsequent to the utterance), (2) information determined from prior utterances of the user or the system's responses to those prior utterances, (3) location information (e.g., derived from Global Positioning System (GPS) data, cell ID data, etc.) associated with the user, (4) environment information regarding the user's surroundings (e.g., who else is in proximity to the user, what song is playing in the background, what else is happening around the user, the weather of the area in which the user is currently at, or other information derived from sensor data or via other techniques), or other information.

In an implementation, speech recognition instructions 121, natural language processing instructions 122, or other components may process portions of a natural language utterance in parallel with receipt of other portions of the utterance. As an example, speech recognition instructions 121 may process portions of the utterance in a continuous manner as those portions are received and before other portions of the utterance are received. As a further example, natural language processing instructions 122 may process recognized words of received portions of the utterance in a continuous manner as those words are recognized and before words of other portions of the utterance are recognized (or other portions of the utterance are received).

In an implementation, user device 160 may perform one or more of the operations described herein (e.g., some of the operations described as performed by system 100, all of the operations described as performed by system 100, etc.). As an example, user device 160 may comprise preliminary input processing instructions 120, and may process portions of a natural language utterance as they are received to detect an end of the utterance. In parallel with the processing to detect the end of the utterance, user device 160 may stream portions of the utterance to computer system 104 as they are received (and before other portions of the utterance are received at user device 160). Computer system 104 may begin processing the portions of the utterance as they are received from user device 160 (and before other portions of the utterance are received) to recognize words of the received utterance portions, predict an intent of the user in speaking the utterance (or portions thereof) based on the received portions, generate a user request based on the predicted intent, obtain related content based on the user request, or perform other operations without waiting for user device 160 to detect an end of the utterance.

As another example, user device 160 may comprise preliminary input processing instructions 120 and speech recognition instructions 121 and may process portions of a natural language utterance as they are received (and before other portions of the utterance are received) to recognize words of the received utterance portions. User device 160 may provide the recognized words of the received utterance portions to computer system 104 as those words are recognized (and before words of other portions of the utterance are recognized or other portions of the utterance are received). Computer system 104 may begin processing the recognized words as they are received from user device 160 (and before other recognized words of the utterance are received) to predict an intent of the user in speaking the utterance (or portions thereof) based on the received recognized words, generate a user request based on the predicted intent, obtain related content based on the user request, or perform other operations without waiting for user device 160 to detect an end of the utterance.

As yet another example, user device 160 may comprise preliminary input processing instructions 120, speech recognition instructions 121, and natural language processing instructions 122. In one use case, for instance, user device 160 may process portions of a natural language utterance as they are received to detect an end of the utterance. In addition, in parallel with the processing to detect the end of the utterance, user device 160 may process the portions of the utterance as they are received (and before other portions of the utterance are received) to recognize words of the received utterance portions, predict an intent of the user in speaking the utterance (or portions thereof) based on the received portions, generate a user request based on the predicted intent, obtain related content based on the user request, or perform other operations without waiting for an end of the utterance detection.

Inferring Words of not-Yet-Spoken Portions of a Natural Language Utterance

In an implementation, based on a prediction of an intent of a natural language utterance of a user, natural language processing instructions 122 may infer one or more words of a portion of the utterance that the user has not yet spoken (but is predicted to have intended to say). A set of words comprising one or more words of a first utterance portion (of the utterance that the user has spoken) and the words of the not-yet-spoken utterance portion may be provided for presentation to the user. As an example, upon receipt of the set of words (comprising the words of the first utterance portion and the words of the not-yet-spoken portion) from natural language processing instructions 122, presentation instructions 127 may provide the set of words for presentation to the user. The presentation of the spoken words and the inferred unspoken words may, for instance, be provided to enable user confirmation of the predicted intent of the user (on which the inferred unspoken words are based) in speaking the utterance. Such presentation may alternatively or additionally guide the user in finishing his/her speech queries and/or commands.

Figure 3A:
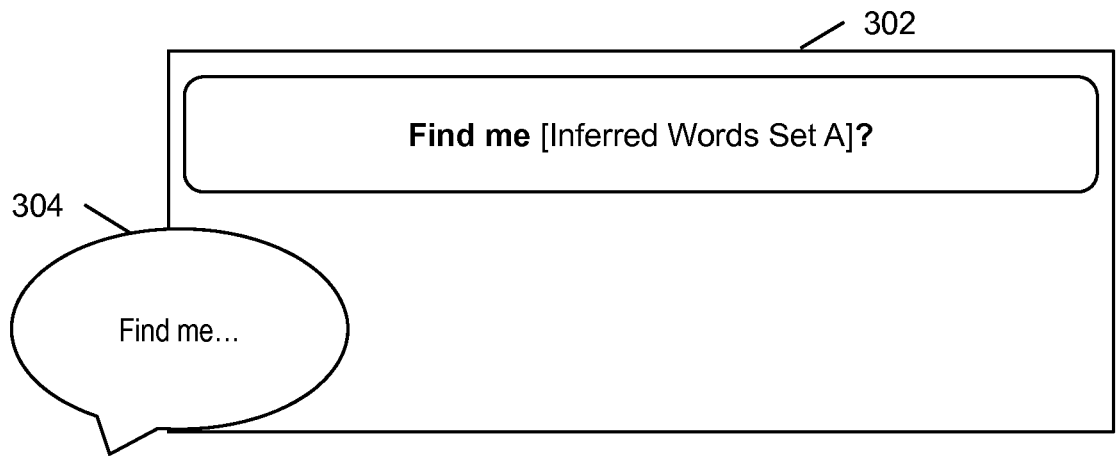
FIGS. 3A-3C illustrate screenshots of a user interface depicting features related to continuous intent predictions, in accordance with one or more implementations of the invention.

As an example, with respect to FIG. 3A, the words "Find me" of a user's utterance may be recognized by speech recognition instructions 121 and provided to natural language processing instructions 122 prior to the user speaking other portions of the utterance. Upon receipt of the words "Find me" (and/or before other recognized words of the utterance are received), natural language processing instructions 122 may process the words "Find me," along with related context information, to predict an intent of the user in speaking the utterance (that comprises the words "Find me"). In one use case, the related context information may be based on a conversation between the user and another entity that is "heard" by the system (e.g., having a component with an always-listening mode). For example, during the conversation, the user or the other entity may have indicated that they should have lunch shortly. If the user then spoke the words "Find me" (during the same conversation or shortly thereafter), natural language processing instructions 122 may utilize the recognized words "Find me" and the indication that the user and/or the other entity want to have lunch shortly to predict that the user intends to search for restaurants that are currently open.

As another example, with respect to FIG. 3A, natural language processing 122 may predict the "full" utterance (which the user has not finished speaking) based on the predicted intent and/or other information. In one use case, for example, natural language processing instructions 122 may infer words of portions of the utterance that the user has not yet spoken (but is predicted to have intended to say) based on the prediction of the full utterance. As shown in FIG. 3A, the recognized words of the spoken portions and the inferred words of the not-yet-spoken portions (e.g., "Find me [Inferred Words Set A]") may be provided for presentation to the user.

In another use case, the user may confirm that the presented prediction of the utterance (e.g., the presented recognized words and inferred words) is an accurate prediction of what the user was going to say. The user may, for example, confirm the accuracy of the prediction by selecting the presented prediction of the utterance (e.g., by tapping/clicking on the presented prediction), speaking another utterance that indicates that the prediction of the utterance is accurate (e.g., "Yes, that's what I want"), etc.

Figure 3B:
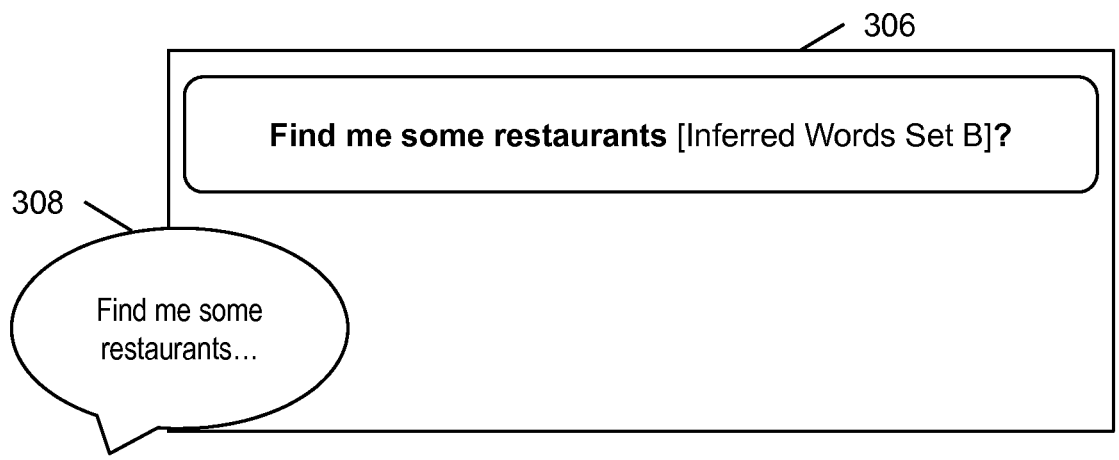
Figure 3C:
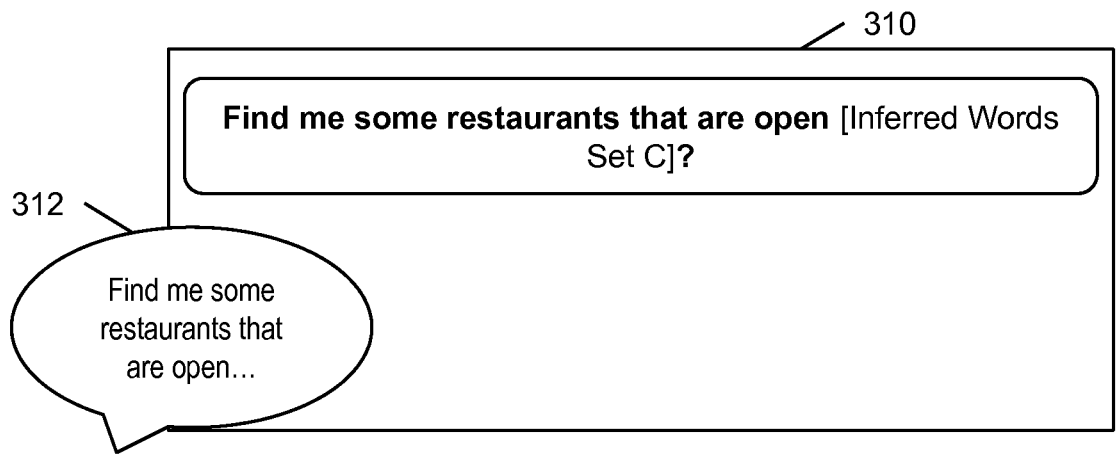

In another use case, the user may continue to speak one or more remaining portions of the utterance, and natural language processing instructions 122 may continue to update and provide a set of recognized words (of spoken portions of the utterance) and inferred words (of not-yet-spoken portions of the utterance) for presentation to the user. As shown in FIGS. 3A-3C, as the user continues to speak, the set of recognized words and inferred words that are presented to the user is continuously updated. For example, screenshot 302 may represent the user interface when the user has just spoken the words "Find me" (represented by indicator 304), screenshot 306 may represent the user interface when the user has just spoken the words "Find me some restaurants" (represented by indicator 308), and screenshot 310 may represent the user interface when the user has just spoken the words "Find me some restaurants that are open" (represented by indicator 312).

In an implementation, natural language processing instructions 122 may determine context information for interpreting and/or reinterpreting one or more other natural language utterances (e.g., prior utterances, subsequent utterances, etc.) based on recognized words of portions of a natural language utterance that a user has spoken and/or inferred words of portions of the utterance that the user has not yet spoken (but is predicted to have intended to say). As an example, with respect to FIG. 4A, the presented set of words with Inferred Words Set A may comprise "Find me some nearby restaurants that are currently open." If the set of words is determined to be an accurate representation of what the user intended to say (e.g., based on a user confirmation), the presented words may be utilized to determine context information for interpreting and/or reinterpreting a prior user utterance spoken by the user, a subsequent user utterance spoken by the user, or prior and/or subsequent utterances spoken by other users (e.g., that are captured by the user device, that are associated with users in proximity to a device at which the set of words were presented, etc.).

Figure 4A:
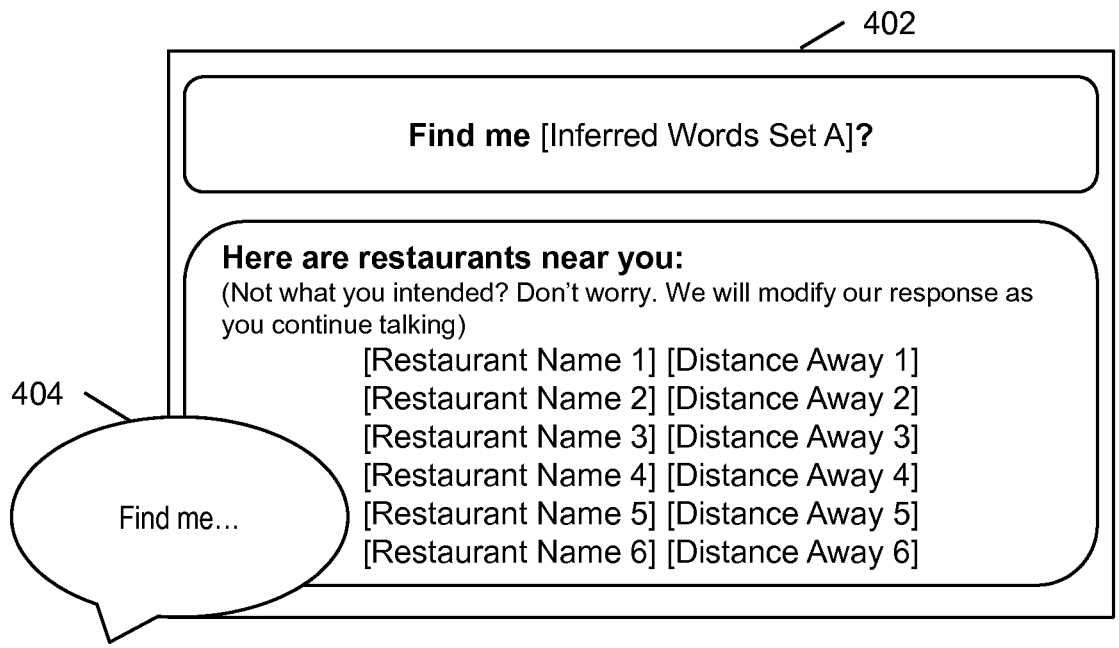
FIGS. 4A and 4B illustrate screenshots of user interfaces depicting features related to continuous intent predictions, in accordance with one or more implementations of the invention.
Figure 4B:
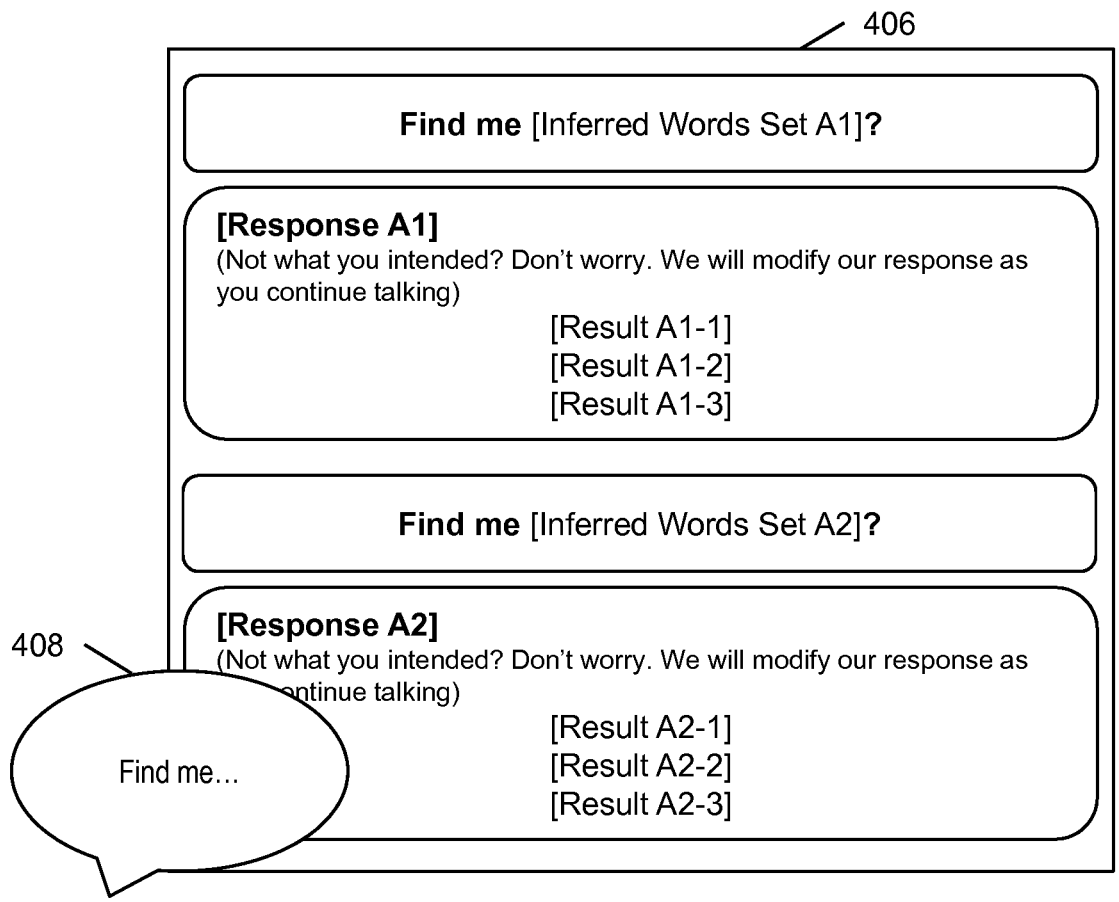

As another example, with respect to FIG. 4B, at least two sets of words may be presented to the user such that each set may represent a different prediction of what the user intends to say. In one use case, the set of words with Inferred Words Set A1 may comprise "Find me some nearby restaurants that are currently open," and the set of words with Inferred Words Set A2 may comprise "Find me the cheapest gas station nearby." One or more of the presented sets of words may be utilized to determine context information for interpreting and/or reinterpreting a prior user utterance spoken by the user, a subsequent user utterance spoken by the user, or prior and/or subsequent utterances spoken by other users. For example, even if the set of words "Find me the cheapest gas station nearby" is not determined to be an accurate representation of what the user intended to say when speaking a portion of an utterance, a subsequent utterance of the user (e.g., "I would like to fill up") may be interpreted based on context information indicating the user was presented with the set of words.

In an implementation, natural language processing instructions 122 may predict a subsequent natural language utterance of a user based on recognized words of portions of a natural language utterance that the user has spoken and/or inferred words of portions of the utterance that the user did not speak (but is predicted to have intended to say). As an example, with respect to FIG. 4A, the presented set of words with Inferred Words Set A may comprise "Find me some nearby restaurants that are currently open." In one use case, if the set of words is determined to be an accurate representation of what the user intended to say, and statistical information indicates that users almost always call a restaurant after submitting a query for currently-opened nearby restaurants, natural language processing instructions 122 may predict that the user will subsequently follow up with an utterance comprising the "call" action (e.g., "Call [Restaurant Name 1]").

Pre-Fetching Related Content

In an implementation, multiple predictions regarding what a user intended when speaking a natural language utterance may be performed, and content (or results) related to the predicted intents may be obtained. The predicted intents may comprise intents predicted based on a first portion of the utterance (without using a second portion of the utterance that the user spoke after speaking the first utterance portion), intents predicted based on the second utterance portion (e.g., based on the first and second utterance portions, based on the second utterance portion without using the first utterance portion, etc.), or other predicted intents.

In an implementation, natural language processing instructions 122 may generate a first user request based on a first predicted intent associated with a natural language utterance of a user, a second user request based on a second predicted intent associated with the utterance, and so on. Upon generation of the requests, agent management instructions 126 may provide the requests to the appropriate agents (e.g., domain agents). One or more first results related to the utterance (or the first request) may be obtained based on the first request, one or more second results related to the utterance (or the second request) may be obtained based on the second request, and so on. The results may, for example, be obtained prior to system 100 settling on a predicted intent as what the user intended in speaking the utterance, prior to system 100 detecting an end of the utterance, etc.

In an implementation, results that are obtained based on predicted intents (or requests generated from these or other predictions) associated with a natural language utterance of a user may be provided for presentation to the user, for example, prior to system 100 settling on a predicted intent as what the user intended in speaking the utterance, prior to system 100 detecting an end of the utterance, etc.

As an example, with respect to FIG. 4A, the utterance "Find me [Inferred Words Set A]" may be predicted based on the utterance portion "Find me" spoken by the user. The predicted intent associated with the utterance may, for example, comprise a prediction that the user intends to search for restaurants near the current location of the user. Based on the prediction, a request for nearby restaurants may be generated, and related results may be obtained based on a request. As shown in FIG. 4A, screenshot 402 may represent a user interface that presents the predicted utterance (that includes recognized words of spoken portions and inferred words of not-yet-spoken portions) and the related results as a response to the user speaking the words "Find me" (represented by indicator 404). In one use case, the predicted utterance and the related results may be presented to the user to enable the user to confirm the predicted utterance (or its associated predicted intent) as what the user intended to say. Natural language processing instructions 122 may, for example, utilize the user confirmation to settle on (or confirm) the predicted intent as what the user intended in speaking the utterance (or portions thereof).

As another example, with respect to FIG. 4B, at least two utterances may be predicted based on the utterance portion "Fine me" spoken by the user, and respective requests may be generated based on the predicted utterances (or their associated predicted intents). As shown in FIG. 4B, screen shot 406 may represent a user interface that presents the predicted utterances and the related results as a response to the user speaking the words "Find me" (represented by indicator 408). In one use case, the predicted utterances and their respective related results may be presented to the user to enable the user to select (from among the presented predicted utterances) at least one predicted utterance (or its associated predicted intent) as what the user intended to say. Natural language processing instructions 122 may, for example, utilize the user selection to settle on (or confirm) the predicted intent as what the user intended in speaking the utterance (or portions thereof).

In an implementation, results that are obtained based on predicted intents (or requests generated from these or other predictions) associated with a natural language utterance of a user may be stored (e.g., in a cache) for later use. As an example, in the event that at least one of the predicted intents is confirmed/settled as what the user intended when the user spoke the utterance (or portions thereof), the set of results related to the settled/confirmed intent may be obtained from storage and provided for presentation to the user. Presentation instructions 127 (or other component) may, for instance, store the results locally (e.g., in a cache) so that the set of results related to the settled/confirmed intent may be quickly obtained from the local storage and provided for presentation to the user upon settling on an intent of the user in speaking the utterance. In this way, unnecessary delay associated with waiting until a user's intent is confirmed before generating related requests and obtaining related results may be reduced.

In one use case, at least one predicted utterance (comprising at least inferred words of not-yet-spoken portions) may be provided for presentation to a user (e.g., without presentation of related results) to enable the user to confirm or select a predicted utterance as what the user intended to say. Natural language processing instructions 122 may, for example, utilize the user confirmation or selection to settle on (or confirm) a predicted intent as what the user intended in speaking the utterance (or portions thereof). Upon settling on or confirming the user's intent, the pre-stored results (e.g., pre-stored in a cache) related to the settled intent may be utilized to generate a response for presentation to the user (e.g., a natural language speech response identifying one or more of the related results, a visual presentation of one or more of the related results, or other response). Other pre-stored results that are not related to the settled intent (but related to other predicted intents that do not correspond to the settled intent) may, for example, not be utilized to generate the response.

In an implementation, natural language processing instructions 122 may determine context information for interpreting and/or reinterpreting one or more other natural language utterances (e.g., prior utterances, subsequent utterances, etc.) based on results obtained in accordance with predictions regarding a natural language utterance. As an example, with respect to FIG. 4A, the presented set of words with Inferred Words Set A may comprise "Find me some nearby restaurants that are currently open." If the set of words is determined to be an accurate representation of what the user intended to say (e.g., based on a user confirmation), the presented words and/or the associated results may be utilized to determine context information for interpreting and/or reinterpreting a prior user utterance spoken by the user, a subsequent user utterance spoken by the user, or prior and/or subsequent utterances spoken by other users (e.g., that are captured by the user device, that are associated with users in proximity to a device at which the associated results were presented, etc.).

As another example, with respect to FIG. 4B, at least two sets of words may be presented to the user such that each set may represent a different prediction of what the user intends to say. In one use case, the set of words with Inferred Words Set A1 may comprise "Find me some nearby restaurants that are currently open," and the set of words with Inferred Words Set A2 may comprise "Find me the cheapest gas station nearby." One or more of the presented sets of words and/or their associated results may be utilized to determine context information for interpreting and/or reinterpreting a prior user utterance spoken by the user, a subsequent user utterance spoken by the user, or prior and/or subsequent utterances spoken by other users. For example, even if results identifying nearby gas stations are not what the user intended to obtain when speaking a portion of an utterance, a subsequent utterance of the user (e.g., "I would like to fill up") may be interpreted based on context information indicating the user was presented with the gas station results.

In an implementation, natural language processing instructions 122 may predict a subsequent natural language utterance of a user based on results obtained in accordance with predictions regarding a natural language utterance. As an example, with respect to FIG. 4A, the presented set of words with Inferred Words Set A may comprise "Find me some nearby restaurants that are currently open." In one use case, if the set of words is determined to be an accurate representation of what the user intended to say, and there is only one restaurant returned as a result (e.g., it's the only nearby restaurant currently open), natural language processing instructions 122 may predict that the user will subsequently follow up with an utterance comprising the "call" action and the name of the listed restaurant (e.g., "Call [Restaurant Name 1]"). The prediction of the subsequent utterance may, for example, be based on statistical information indicating that users typically call a restaurant after submitting a query for currently-open, nearby restaurants.

Other Implementations

It should be appreciated that, although the various instructions are illustrated in FIG. 1 as being co-located within a single computing device 110, one or more instructions may be executed remotely from the other instructions. For example, some computing devices 110 of computer system 104 may be programmed by some instructions while other computing devices 110 may be programmed by other instructions. Furthermore, the various instructions described herein are exemplary only. Other configurations and numbers of instructions may be used, so long as processor(s) 112 are programmed to perform the operations described herein.

The description of the functionality provided by the different instructions described herein is for illustrative purposes, and is not intended to be limiting, as any of the instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor(s) 112, as well as data that may be manipulated by processor(s) 112. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, in accordance with various implementations, the components described herein may be implemented in hardware and/or software that configures hardware.

User device(s) 160 may include a device that can interact with computer system 104 through network 102. Such user device(s) may include, without limitation, a tablet computing device, a smartphone, a laptop computing device, a desktop computing device, a network-enabled appliance such as a "Smart" television, a vehicle computing device, and/or other device that may interact with computer system 104.

The various databases 130 described herein may be, include, or interface to, for example, an Oracle™ relational database sold commercially by Oracle Corporation. Other databases, such as Informix™, DB2 (Database 2), or other data storage, including file-based (e.g., comma- or tab-separated files), or query formats, platforms, or resources such as OLAP (On Line Analytical Processing), SQL (Structured Query Language), a SAN (storage area network), Microsoft Access™, MySQL, PostgreSQL, HSpace, Apache Cassandra, MongoDB, Apache CouchDB™, or others may also be used, incorporated, or accessed. The database may comprise one or more such databases that reside in one or more physical devices and in one or more physical locations. The database may store a plurality of types of data and/or files and associated data or file descriptions, administrative information, or any other data. The database(s) 130 may be stored in storage device 114 and/or other storage that is accessible to computer system 104.

Example Flow Diagrams

The following flow diagrams describe operations that may be accomplished using some or all of the system components described in detail above, and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Figure 5:
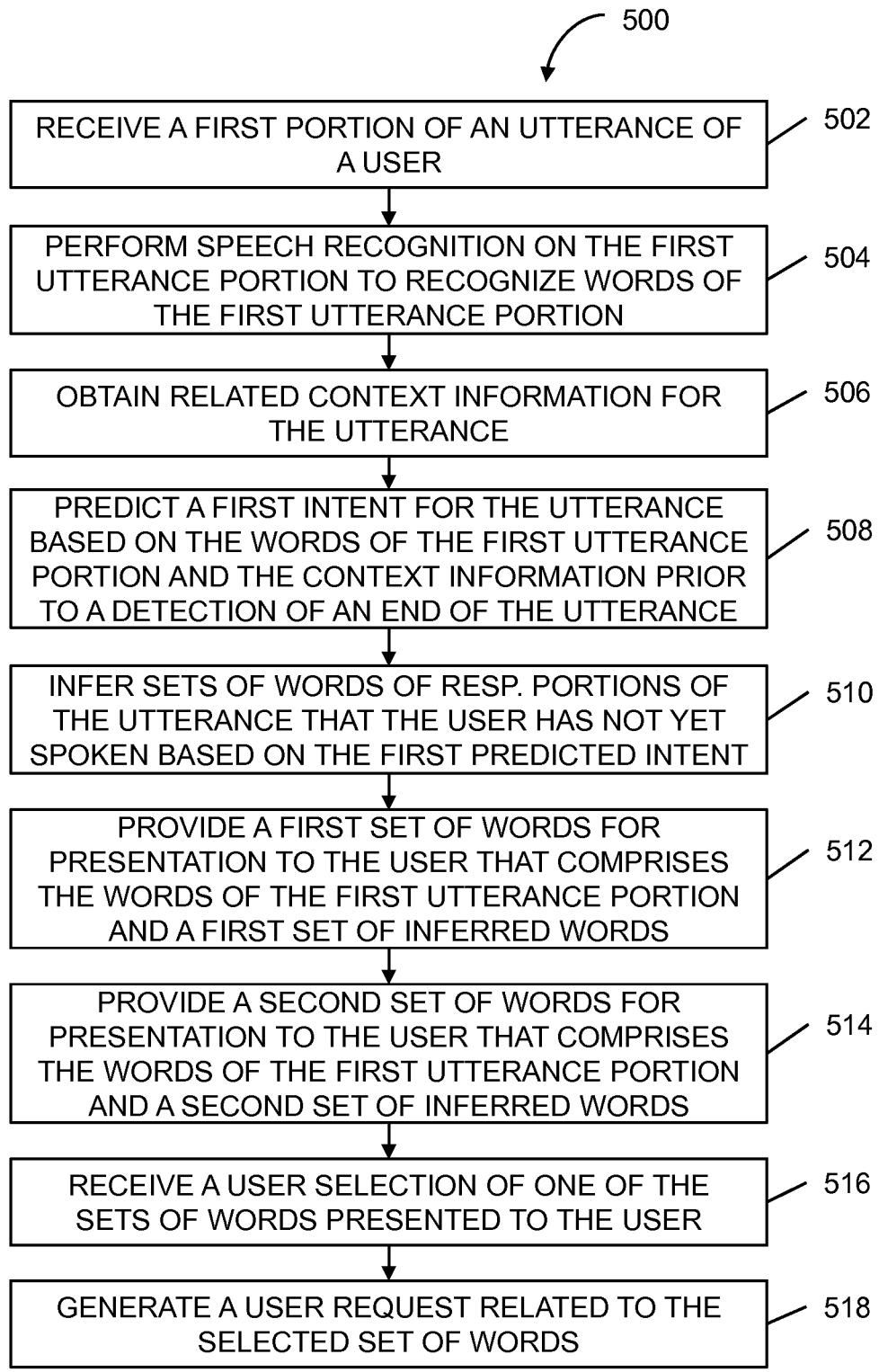
FIG. 5 illustrates a process flow diagram for providing intent prediction for a natural language utterance based on a portion of the utterance prior to a system detection of an end of the utterance, in accordance with one or more implementations of the invention.

FIG. 5 illustrates a process flow diagram for providing intent prediction for a natural language utterance based on a portion of the utterance prior to a system detection of an end of the utterance, in accordance with one or more implementations of the invention.

In an operation 502, a first portion of a natural language utterance of a user may be received.

In an operation 504, speech recognition may be performed on the first portion of the utterance to recognize one or more words of the first portion.

In an operation 506, related context information may be obtained for the utterance.

In an operation 508, a first intent may be predicted for the utterance based on the words of the first portion and the context information. The first intent may, for instance, be predicted prior to a detection of an end of the utterance.

In an operation 510, sets of words of one or more respective portions of the utterance that the user has not yet spoken may be inferred based on the first predicted intent.

In an operation 512, a first set of words may be provided for presentation to the user that comprises the words of the first portion and a first set of inferred words. As an example, the first set of inferred words may comprise one of the sets of words of respective not-yet-spoken portions of the utterance that are inferred based on the first predicted intent.

In an operation 514, a second set of words may be provided for presentation to the user that comprises the words of the first portion and a second set of inferred words. As an example, the second set of inferred words may comprise another one of the sets of words of respective not-yet-spoken portions of the utterance that are inferred based on the first predicted intent (e.g., such that the first and second sets of inferred words are different from one another).

In an operation 516, a user selection of one of the sets of words that are presented to the user may be received.

In an operation 518, a user request related to the selected set of words may be determined (e.g., the selected set of words may be utilized to determine the user request).

Figure 6:
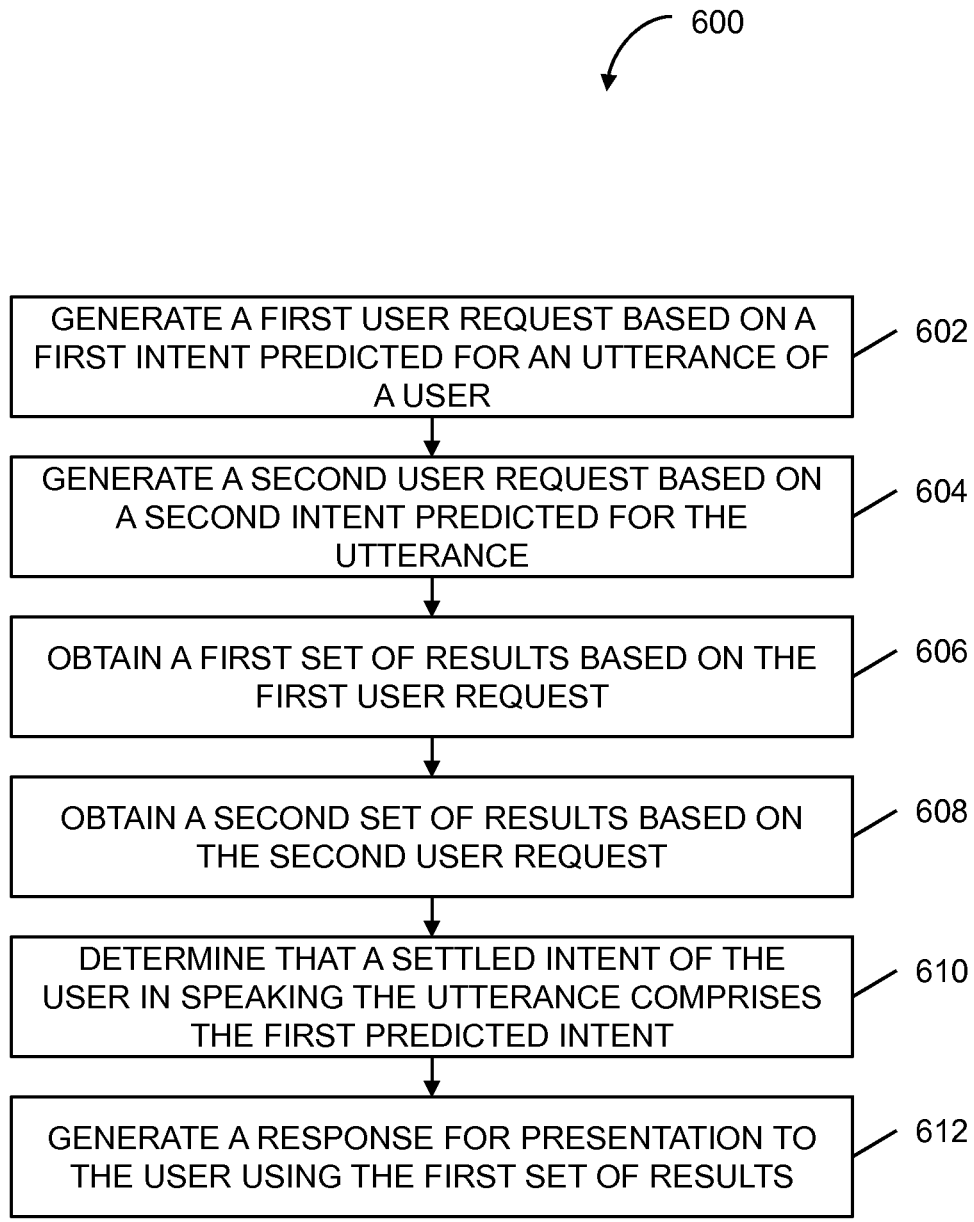
FIG. 6 illustrates a process flow diagram for generating a response for a natural language utterance based on pre-fetched related content obtained prior to settlement on the utterance intent, in accordance with one or more implementations of the invention.

FIG. 6 illustrates a process flow diagram for generating a response for a natural language utterance based on pre-fetched related content obtained prior to settlement on the utterance intent, in accordance with one or more implementations of the invention.

In an operation 602, a first user request may be determined based on a first intent that is predicted for a natural language utterance of a user.

In an operation 604, a second user request may be determined based on a second intent that is predicted for the utterance of the user.

In an operation 606, a first set of results may be obtained based on the first user request.

In an operation 608, a second set of results may be obtained based on the second user request.

In an operation 610, a determination that a settled intent of the user (in speaking the utterance) comprises the first predicted intent may be effectuated.

In an operation 612, a response may be generated for presentation to the user using the first set of results. As an example, the response may be generated using the first set of results in response to the determination that the settled intent of the user (in speaking the utterance) comprises the first predicted intent.

Figure 7:
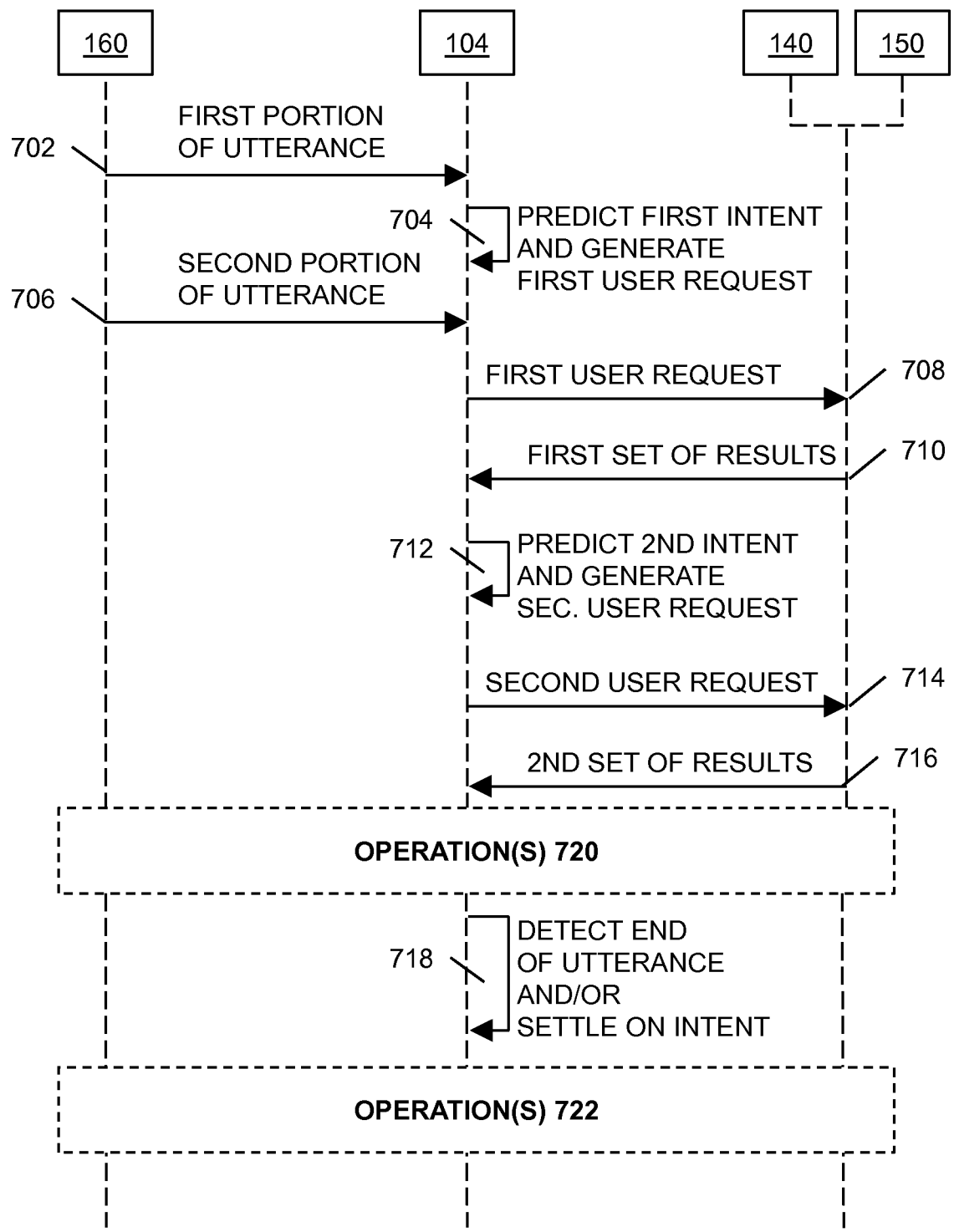
FIG. 7 illustrates a data flow diagram for providing intent prediction for a natural language utterance based on a portion of the utterance prior to a system detection of an end of the utterance, in accordance with one or more implementations of the invention.

FIG. 7 illustrates a data flow diagram for providing intent prediction for a natural language utterance based on a portion of the utterance prior to a system detection of an end of the utterance, in accordance with one or more implementations of the invention.

In operation(s) 702, user device 160 may receive a first portion of a natural language utterance associated with a user and provide the first utterance portion to computer system 104.

In operation(s) 704, upon receipt of the first utterance portion, computer system 104 may predict a first intent associated with the utterance and generate a first user request based on the first predicted intent.

In operation(s) 706, user device 160 may receive a second portion of the utterance and provide the second utterance portion to computer system 104.

In operation(s) 708, computer system 104 may provide the first user request to service provider 140 and/or content provider 150.

In operation(s) 710, upon receipt of the first user request, service provider 140 and/or content provider 150 may provide a first set of results based on the first user request to computer system 104.

In operation(s) 712, upon receipt of the second utterance portion, computer system 104 may predict a second intent associated with the utterance and generate a second user request based on the second predicted intent.

In operation(s) 714, computer system 104 may provide the second user request to service provider 140 and/or content provider 150.

In operation(s) 716, upon receipt of the second user request, service provider 140 and/or content provider 150 may provide a second set of results based on the second user request to computer system 104.

In operation(s) 718, computer system 104 may detect an end of the utterance and/or settle on (or confirm) an intent of the user in speaking the utterance (or portions thereof).

As shown, a number of operation(s) 720 may be performed by one or more components prior to computer system 104 detecting an end of the utterance and/or settling on an intent of the user in speaking the utterance (and/or subsequent to computing system 104 obtaining results related to a predicted intent associated with the utterance). As an example, user device 160 may receive additional portions of the utterance spoken by the user and provide the additional utterance portions to computer system 104 for further processing. Computer system 104 may predict additional intents based on the additional utterance portions and generate additional user requests (on which additional sets of results may be based). Additionally, or alternatively, computer system 104 may rescore the first or second predicted intents based on the additional utterance portions.

As another example, computer system 104 may provide representations of what the user is predicted to have intended to say for presentation to the user (e.g., via user device 160) prior to computer system 104 detecting an end of the utterance and/or settling on an intent of the user in speaking the utterance. In one use case, for instance, a representation of what the user is predicted to have intended to say may comprise a set of words. The set of words may comprise one or more recognized words of portions of the utterance that the user has spoken and/or one or more inferred words of portions of the utterance that the user has not yet spoken. The representations of the predictions may, for example, enable user confirmation/selection of at least one the predictions of what the user intended to say. Such presentation may alternatively or additionally guide the user in finishing his/her utterances (e.g., to formulate speech queries and/or commands).

As another example, computer system 104 may provide one or more results related to the user requests (generated based on the predicted intents) for presentation to the user (via user device 160). In one use case, the results may be provided for presentation together with the predictions of the utterance (e.g., what the user is going to say).

As shown, a number of operation(s) 722 may be performed by one or more components subsequent to computer system 104 detecting an end of the utterance and/or settling on an intent of the user in speaking the utterance. As an example, upon settling on an intent of the user in speaking the utterance, computer system 104 may utilize pre-fetched results related to the settled intent to generate a response for presentation to the user.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method of determining an intent prediction for a natural language utterance, prior to a system detection of an end of the natural language utterance, based on a portion of the natural language utterance and statistical information that correlates requests that are linked together in that one type of request statistically follows another type of request, the method being implemented on a computer system that includes one or more physical processors executing computer program instructions which, when executed by the one or more physical processors, perform the method, the method comprising:

receiving, by the computer system, a first natural language utterance of a user;

determining, by the computer system, a first type of user request based on the first natural language utterance;

identifying, by the computer system, at least a second type of user request based on the first type of user request and the statistical information that indicates that the first type of request is made via one or more first spoken words followed by the second type of request, wherein the statistical information indicates that users other than the user have made the second type of request after the first type of request, and wherein identifying the second type of user request comprises determining that the users other than the user made the second type of request after having made the first type of request;

receiving, by the computer system, a first portion of a second natural language utterance of the user;

performing, by the computer system, speech recognition on the first portion of the second natural language utterance to recognize one or more words of the first portion of the second natural language utterance;

receiving, by the computer system, visual inputs provided by the user, wherein the visual inputs are streamed to the computer system and processed in parallel;

determining, by the computer system, prior to a detection of an end of the second natural language utterance, a first intent associated with the second natural language utterance based on the first portion of the second natural language utterance and the identified type of second user request;

determining, by the computer system, an intent associated with the visual inputs provided by the user; and generating, by the computer system, at least one response for presentation to the user, utilizing a pre-fetched result related to at least one of the first intent and the intent associated with the visual inputs.

2. The method of claim 1, further comprising:

obtaining, by the computer system, context information for the second natural language utterance, wherein determining the first intent comprises predicting, prior to the detection of the end of the second natural language utterance, the first intent based on the one or more words of the first portion and the context information.

3. The method of claim 2, further comprising:

determining, by the computer system, prior to the detection of the end of the second natural language utterance, one or more inferred words that the user will utter in the second natural language utterance based on the first determined intent; and providing, by the computer system, prior to the detection of the end of the second natural language utterance, the one or more words of the first portion and the one or more inferred words for user selection.

4. The method of claim 3, the method further comprising:

receiving, by the computer system, a user selection of the one or more inferred words, wherein generating the one or more user requests based on the first determined intent comprises generating a user request based on the user selection.

5. The method of claim 4, further comprising:

determining, by the computer system, prior to the detection of the end of the second natural language utterance, one or more second inferred words that the user will utter in the second natural language utterance based on the first determined intent; and providing, by the computer system, prior to the detection of the end of the second natural language utterance, the one or more second inferred words for user selection.

6. The method of claim 1, further comprising:

obtaining, by the computer system, one or more first results related to the one or more user requests;

receiving, at the computer system, a second portion of the second natural language utterance;

determining, by the computer system, a second intent associated with the second natural language utterance based on the second portion of the second natural language utterance;

generating, by the computer system, a second user request based on the second determined intent;

obtaining, by the computer system, one or more second results related to the second user request;

determining, by the computer system, an intent of the user in speaking at least a portion of the second natural language utterance;

determining, by the computer system, whether at least one of the first intent or the second intent corresponds to the intent of the user; and generating, by the computer system, a response for presentation to the user: (a) using the one or more first results responsive to a determination that the first intent corresponds to the intent of the user; and (b) using the one or more second results responsive to a determination that the second intent corresponds to the intent of the user.

7. The method of claim 6, wherein generating the response comprises generating the response using the one or more first results and without using the one or more second results responsive to a determination that the first intent corresponds to the intent of the user and that the second intent does not correspond to the intent of the user.

8. The method of claim 1, further comprising:

obtaining, by the computer system, one or more first results related to the one or more user requests; and providing, by the computer system, prior to the detection of the end of the second natural language utterance, the one or more first results for presentation to the user.

9. The method of claim 8, wherein obtaining one or more first results related to the first type of user request comprises:

causing, by the computer system, a search query to be executed based on the first intent;

obtaining, by the computer system, one or more search results of the search query, wherein the one or more first results includes at least the one or more search results.

10. The method of claim 1, further comprising:

performing, by the computer system, speech recognition on one or more portions of the second natural language utterance to recognize one or more words of the one or more portions of the second natural language utterance; and performing, by the computer system, semantic processing on the one or more words of the one or more portions to detect the end of the second natural language utterance.

11. The method of claim 1, wherein the one or more user requests comprise at least one of a command or a query.

12. The method of claim 1, further comprising:

identifying, by the computer system, one or more domain agents based on the first intent;

providing, by the computer system, the one or more user requests to the one or more domain agents for resolution of the one or more user requests.

13. A system for determining an intent prediction for a natural language utterance, prior to a system detection of an end of the natural language utterance, based on a portion of the natural language utterance and statistical information that correlates requests that are linked together in that one type of request statistically follows another type of request, the system comprising:

one or more physical processors programmed with computer program instructions which, when executed, cause the one or more physical processors to:

receive a first natural language utterance of a user;

determine a first type of user request based on the first natural language utterance;

identify at least a second type of user request based on the first type of user request and the statistical information that indicates that the first type of request is made via one or more first spoken words followed by the second type of request, wherein the statistical information indicates that users other than the user have made the second type of request after the first type of request, and wherein identifying the second type of user request comprises determining that the users other than the user made the second type of request after having made the first type of request;

receive a first portion of a second natural language utterance of the user;

perform speech recognition on the first portion of the second natural language utterance to recognize one or more words of the first portion of the second natural language utterance;

receive visual inputs provided by the user, wherein the visual inputs are streamed to the computer system and processed in parallel;

determine, prior to a detection of an end of the second natural language utterance, a first intent associated with the second natural language utterance based on the first portion of the second natural language utterance and the identified second type of user request;

determine an intent associated with the visual inputs provided by the user; and generate at least one response for presentation to the user, utilizing a pre-fetched result related to at least one of the first intent and the intent associated with the visual inputs.

14. The system of claim 13, wherein the one or more physical processors are further caused to:
  perform speech recognition on the first portion of the second natural language utterance to recognize one or more words of the first portion of the second natural language utterance; and
  obtain context information for the second natural language utterance, wherein determining the first intent comprises predicting, prior to the detection of the end of the second natural language utterance, the first intent based on the one or more words of the first portion and the context information.

15. The system of claim 14, wherein the one or more physical processors are further caused to:
  determine, prior to the detection of the end of the second natural language utterance, one or more inferred words that the user will utter in the second natural language utterance based on the first determined intent; and
  provide, prior to the detection of the end of the second natural language utterance, the one or more words of the first portion and the one or more inferred words for user selection.

16. The system of claim 15, wherein the one or more physical processors are further caused to:
  receive a user selection of the one or more inferred words, wherein generating the one or more user requests based on the first determined intent comprises generating a user request based on the user selection.

17. The system of claim 16, wherein the one or more physical processors are further caused to:
  determine, prior to the detection of the end of the second natural language utterance, one or more second inferred words that the user will utter in the second natural language utterance based on the first determined intent; and
  provide, prior to the detection of the end of the second natural language utterance, one or more second inferred words for user selection.

18. The system of claim 13, wherein the one or more physical processors are further caused to:
  obtain one or more first results related to the one or more user requests; receive a second portion of the second natural language utterance after the receipt of the first portion of the second natural language utterance;
  determine a second intent associated with the natural language utterance based on the second portion of the second natural language utterance;
  determine a second user request based on the second determined intent;
  obtain one or more second results related to the second user request;
  determine an intent of the user in speaking at least a portion of the second natural language utterance;
  determine whether at least one of the first intent or the second intent corresponds to the intent of the user; and
  generate a response for presentation to the user: (a) using the one or more first results responsive to a determination that the first intent corresponds to the intent of the user; and (b) using the one or more second results responsive to a determination that the second intent corresponds to the intent of the user.

19. The system of claim 18, wherein generating the response comprises generating the response using the one or more first results and without using the one or more second results responsive to a determination that the first intent corresponds to the intent of the user and that the second intent does not correspond to the intent of the user.

20. The system of claim 13, wherein the one or more physical processors are further caused to:
  obtain one or more first results related to the one or more user requests; and
  provide, prior to the detection of the end of the second natural language utterance, the one or more first results for presentation to the user.

21. The system of claim 13, wherein the one or more physical processors are further caused to:
  perform speech recognition on one or more portions of the second natural language utterance to recognize one or more words of the one or more portions of the second natural language utterance; and perform semantic processing on the one or more words of the one or more portions to detect the end of the second natural language utterance.

22. The system of claim 13, wherein the one or more user requests comprise at least one of a command or a query.

23. A method of determining an intent prediction for a natural language utterance, prior to a system detection of an end of the natural language utterance, based on a portion of the natural language utterance and statistical information that correlates requests that are linked together in that one type of request statistically follows another type of request, the method being implemented on a computer system that includes one or more physical processors executing computer program instructions which, when executed by the one or more physical processors, perform the method, the method comprising:
  receiving, by the computer system, a first natural language utterance of a user;
  determining, by the computer system, a first type of user request based on the first natural language utterance;
  identifying, by the computer system, at least a second type of user request based on the first type of user request and the statistical information that indicates that the first type of request is made via one or more first spoken words followed by the second type of request, wherein the statistical information indicates that users other than the user have made the second type of request after the first type of request, and wherein identifying the second type of user request comprises determining that the users other than the user made the second type of request after having made the first type of request;
  receiving, by the computer system, a first portion of a second natural language utterance of a user;
  performing, by the computer system, speech recognition on the first portion of the second natural language utterance to recognize one or more words of the first portion of the second natural language utterance;
  obtaining, by the computer system, context information for the second natural language utterance;
  receiving, by the computer system, visual inputs provided by the user, wherein the visual inputs are streamed to the computer system and processed in parallel;
  determining, by the computer system, an intent associated with the visual inputs provided by the user;
  determining, by the computer system, prior to the detection of the end of the second natural language utterance, a first intent based on the one or more words of the first portion, the context information, and the identified second type of user request;
  determining, by the computer system, prior to the detection of the end of the second natural language utterance, one or more inferred words that the user will utter in the second natural language utterance based on the first determined intent;

providing, by the computer system, the one or more words of the first portion and the one or more inferred words for user selection;

receiving, at the computer system, a user selection of the one or more inferred words; and determining, by the computer system, at least one response for presentation to the user, utilizing a pre-fetched result related to at least one of the first intent, the one or more inferred words and the intent associated with the visual inputs.

24. The method of claim 23, the method further comprising:

determining, by the computer system, prior to the detection of the end of the second natural language utterance, one or more second inferred words that the user will utter in the second natural language utterance based on the first determined intent; and providing, by the computer system, prior to the detection of the end of the second natural language utterance, the one or more second inferred words for user selection.

25. The method of claim 23, further comprising:

receiving, at the computer system, a third utterance of the user;

determining, by the computer system, third context information for the third utterance based on the one or more words of the first portion of the second natural language utterance and, the one or more inferred words; and determining, by the computer system, one or more user requests based on the third utterance and the third context information.

26. The method of claim 25, wherein the third utterance is received after the receipt of the second natural language utterance.

27. The method of claim 25, wherein the third utterance is received prior to the receipt of the second natural language utterance.

28. A method of determining an intent prediction for a natural language utterance, prior to a system detection of an end of the natural language utterance, based on a portion of the natural language utterance and statistical information that correlates requests that are linked together in that one type of request statistically follows another type of request, the method being implemented on a computer system that includes one or more physical processors executing computer program instructions which, when executed by the one or more physical processors, perform the method, the method comprising:

receiving, by the computer system, a first natural language utterance of a user;

determining, by the computer system, a first type of user request based on the first natural language utterance;

identifying, by the computer system, at least a second type of user request based on the first type of user request and the statistical information that indicates that the first type of request is made via one or more first spoken words followed by the second type of request, wherein the statistical information indicates that users other than the user have made the second type of request after the first type of request, and wherein identifying the second type of user request comprises determining that the users other than the user made the second type of request after having made the first type of request;

receiving, by the computer system, a first portion of a second natural language utterance of the user;

performing, by the computer system, speech recognition on the first portion of the second natural language utterance to recognize one or more words of the first portion of the second natural language utterance;

receiving, by the computer system, visual inputs provided by the user, wherein the visual inputs are streamed to the computer system and processed in parallel;

determining, by the computer system, prior to a detection of an end of the second natural language utterance, a first intent associated with the second natural language utterance based on the first portion of the second natural language utterance and the identified second type of user request;

determining, by the computer system, an intent associated with the visual inputs provided by the user;

determining, by the computer system, a first user request based on the first intent; and obtaining, by the computer system, at least one response for presentation to the user, utilizing a pre-fetched result related to at least one of the first user request and the intent associated with the visual inputs.

29. The method of claim 28, further comprising:

receiving, at the computer system, a second portion of the second natural language utterance;

determining, by the computer system, a second intent associated with the second natural language utterance based on the second portion of the second natural language utterance;

determining, by the computer system, a second user request based on the second determined intent;

obtaining, by the computer system, one or more second results related to the first user request;

selecting, by the computer system, at least one of the first intent or the second intent; and generating, by the computer system, a response for presentation to the user based on the selected one of the first intent or the second intent.

30. The method of claim 29, wherein generating the response comprises generating the response: (a) using the one or more first results responsive to a determination that the first intent corresponds to the intent of the user; and (b) using the one or more second results responsive to a determination that the second intent corresponds to the intent of the user.

31. The method of claim 30, wherein generating the response comprises generating the response using the one or more first results and without using the one or more second results responsive to a determination that the first intent corresponds to the intent of the user and that the second intent does not correspond to the intent of the user.

* * * * *